United States Patent [19]

Nakayama

[11] Patent Number: 5,250,942

[45] Date of Patent: Oct. 5, 1993

[54] EQUIPMENT AND METHOD FOR MANAGEMENT OF TERMINAL IDENTIFICATION NUMBER IN COMMUNICATION SYSTEM

[75] Inventor: Yasunobu Nakayama, Hachioji, Japan

[73] Assignee: Kabushiki Kaisha Toshiba, Kawasaki, Japan

[21] Appl. No.: 754,312

[22] Filed: Sep. 4, 1991

Related U.S. Application Data

[63] Continuation of Ser. No. 469,079, Jan. 23, 1990, abandoned.

[30] Foreign Application Priority Data

Jan. 23, 1989 [JP] Japan .................... 1-13699

[51] Int. Cl.$^5$ .............................. H04Q 1/00
[52] U.S. Cl. ................. 340/825.52; 379/165; 379/246; 340/825.07
[58] Field of Search ........... 340/825.3, 825.31, 825.32, 340/825.33, 825.52, 825.07; 379/165, 210, 211, 245, 246

[56] References Cited

U.S. PATENT DOCUMENTS

| | | | |
|---|---|---|---|
| 3,973,090 | 8/1976 | Miller | 379/246 X |
| 4,218,738 | 8/1980 | Matyas et al. | 340/825.31 X |
| 4,510,493 | 4/1985 | Bux et al. | 340/825.52 X |
| 4,638,313 | 1/1987 | Sherwood, Jr. et al. | 340/825.52 |
| 4,638,583 | 1/1987 | Sherwood | 340/825.52 |
| 4,680,583 | 7/1987 | Grover | 340/825.52 |
| 4,823,377 | 4/1989 | Sugiura et al. | 379/165 X |
| 4,843,385 | 6/1989 | Borras | 340/825.31 X |
| 4,910,506 | 3/1990 | Yoshida et al. | 340/825.52 X |

FOREIGN PATENT DOCUMENTS

| | | | |
|---|---|---|---|
| 0231625 | 12/1984 | Japan | 340/825.07 |
| 0222341 | 10/1986 | Japan | 340/825.07 |

Primary Examiner—Donald J. Yusko
Assistant Examiner—Brian Zimmerman
Attorney, Agent, or Firm—Foley & Lardner

[57] ABSTRACT

Equipment for management of terminal identification numbers in a communication system, including a center and a plurality of terminals connected to the center. Identification numbers of respective terminals registered in advance are attached to data communicating between the center and the respective terminals. Each of the terminals comprises a terminal side memory means for registering the terminal identification numbers therein, initial identification numbers initially registered, means for communication with the center for effecting data communication with the center, terminal side registration means for erasing the initial identification numbers registered in the terminal side memory to register the new terminal identification numbers and the center into the terminal side memory, terminal side control means operative so that when an arbitrary one of the terminals is communicatably connected to the center, the control means delivers a predetermined registration request data to the means for communication with the center to allow the communication means to transmit it to the center.

5 Claims, 17 Drawing Sheets

MAIN UNIT 100 / TERMINAL 50

FIG. 6A

- "*#*#*#" DIAL IN
- "123456" DIAL IN
- CODE "123456" COLLATION → CORRESPONDENCE
- REGISTRATION ENABLE DATA → DISPLAY
- ID "789" DIAL IN
- STORE ID "789" INTO RAM
- ID "789" OVERLAP CHECK → NO OVERLAP
- REGISTRATION INSTRUCTION DATA → REGISTER ID "789" INTO EEPROM
- ID "789" REGISTRATION
- WRITE COMPLETION DATA
- REGISTRATION MODE RELEASE DATA

FIG. 6B

- "*#*#*#" DIAL IN
- "123456" DIAL IN
- CODE "123456" COLLATION → CORRESPONDENCE
- REGISTRATION ENABLE DATA → DISPLAY
- ID "789" DIAL IN
- STORE ID "789" IN RAM
- ID "789" OVERLAP CHECK → OVERLAP
- OVERLAP REGISTRATION DISABLE DATA
- REGISTRATION DISABLE ALARM TONE → DISPLAY, ALARM TONE OUTPUT
- ID "890" DIAL IN
- ERASE ID "789" IN RAM, STORE ID "890" IN RAM
- ID "890" OVERLAP CHECK → NO OVERLAP
- REGISTRATION INSTRUCTION DATA → REGISTER ID "890" INTO EEPROM
- ID "890" REGISTRATION
- WRITE COMPLETION DATA
- REGISTRATION MODE RELEASE DATA

EQUIPMENT AND METHOD FOR MANAGEMENT OF TERMINAL IDENTIFICATION NUMBER IN COMMUNICATION SYSTEM

This application is a continuation of application Ser. No. 07/469,079, filed Jan. 23, 1990, now abandoned.

BACKGROUND OF THE INVENTION

This invention relates to an equipment and a method for the management of identification numbers of respective terminals in a communication system, e.g., in a push-button telephone system, in which communication of control data or speech data is carried out between a plurality of terminals and an exchange unit or a main unit (hereinafter generically called a center) whereby identification numbers of a terminal which effects communication of those data are attached to such data, and a method of implementing the same.

As a typical communication system of this kind, there is a push-button telephone system. Referring to FIG. 1, there is shown a system configuration of a push-button telephone system in which a plurality of terminals are multi-connected to one main unit.

As shown, at least one outside line 3 and a plurality of private line terminals $5_1$ to $5_n$ are connected to the main unit 1. These private line terminals $5_1$ to $5_n$ are multi-connected to the main unit 1 through a speech signal line 7 and a control data line 9. The main unit 1 operates when an AC power of 100 V is delivered from a connector 11 to place these private line terminals $5_1$ to $5_n$ under control to thereby govern telephonic communication between these private line terminals $5_1$ to $5_n$ and the outside line 3 and telephonic communication between these private terminals.

In such a telephone system employing a terminal multiconnection system, control data communicating between main unit 1 and respective private line terminals $5_1$ to $5_n$ are discriminated by identification numbers (ID numbers) for every private line terminal $5_1$ to $5_n$. Namely, for example, as shown in FIG. 2, downstream data outputted from the main unit 1 toward the terminal 5 comprises a code number (hereinafter referred to as a downstream ID number) added at its first position wherein the code number includes one bit code "0" for indicating that this data is identified as the downstream data and an ID number peculiar to the terminal 5. Further, upstream data outputted from the terminal 5 toward the main unit 1 comprises a code number (hereinafter referred to as an upstream ID number) added at its first position wherein the code number includes one bit code "1" for indicating that this data is identified as the upstream data and an ID number peculiar to the terminal 5. Thus, the main unit 1 and the terminals $5_1$ to $5_n$ can discriminate equipment with which they communicate.

Such ID numbers for every terminal are required to be registered by the system at the time of installation of the system or at the time of alteration of the system content such as enlargement of terminals, etc. A conventional arrangement for registering such ID numbers will now be described with reference to the arrangement of a conventional private line terminal 5 in a block form shown in FIG. 3.

The private line terminal 5 includes a CPU 13 for controlling respective components in this terminal. The CPU 13 is connected, through a bus 15, to a ROM 17 in which a control program is stored, a RAM 19 for storing data required for control, and an input/output interface 21 for relaying transmission and reception of control data to and from the respective components in the terminal. Control data from a setting switch 23 for setting an ID number, a key matrix 25 including dial keys and function keys, a hook switch 31 which is turned on/off in response to on hook/off hook of a handset 29, and a main unit interface circuit 33 for relaying communication with the main unit 1 and for delivering power supplied from the main unit 1 to respective components are received by the CPU 13 through the input/output interface 21. On the other hand, control data are transmitted through the input/output interface 21 from the CPU 13 to a main unit interface circuit 33, a speech switch 39 for selectively connecting a speech signal line 35 from the main unit interface circuit 33 to either the handset 29 or a speaker 37 for on hook speech, and a display 41 for conducting various displays such as call incoming display or calling display, etc.

The handset 29 is connected to the speech switch 39 through a speaking of speech circuit 43 having a two-wire/four-wire conversion function. Further, the speaker 37 is connected to the speech switch 39 through an output amplifier 45.

The main unit interface circuit 33 includes a speech interface unit 33a connected to the speech signal line and a data interface unit 33b connected to the control data line 9.

Registration of ID numbers is carried out by using the setting switch 23. The setting switch 23 is comprised of, e.g., a rotary switch of four bits. By manually operating this switch, ID numbers are determined in succession. The ID number determined by the setting switch 23 is inputted to the CPU 13 through the input/output interface 21. The CPU 13 outputs the ID number thus inputted to the main unit interface circuit 33 through the input/output interface 21. The main unit interface circuit 33 sends control data indicative of the ID number from the data interface unit 33b to the control data line 9. A current ID number of the terminal 5 is added to the first position of the data indicative of ID number. The ID number added control data is sent to the control data line 9 and is then received by the main unit 1. The main unit 1 recognizes which terminal sends this current control data on the basis of the ID number attached to the first position of the received data to rewrite the ID number of the terminal 5 registered in the memory assembled to provide the ID number indicated by the received data.

As stated above, in the conventional communication system, ID numbers are registered by the setting switch 23 manually operated like a rotary switch provided at each terminal. However, since a user of each terminal can arbitrarily operate such a setting switch 23, he might conduct an illegal or unjust act or deed, e.g., to alter an ID number of the terminal assigned to himself to an ID number of the terminal assigned to any other person to thereby allow the main unit to recognize as if calling of the user himself would be calling of any other person to escape the own charging, or to alter an ID number of the terminal subject to the outside line calling regulation to an ID number of the terminal where the outside line calling is permitted to thereby violate the outside line calling regulation, etc.

In view of this, an approach was proposed to to use, instead of the setting switch 23, a ROM in which ID numbers are written in advance to allow the CPU 13 to read the content recorded in the ROM to send the recorded content to the main unit 1, thereby conducting a registration. In the case of the approach using ROM, the action as stated above cannot be carried out with ease. To the contrary, where there is a need to alter ID numbers resulting from the alteration of the system content, troublesome work to exchange one ROM with another ROM is required.

A further problem is that it is troublesome to check overlapping of ID numbers within the same system even in either case of setting switch 23 or ROM.

SUMMARY OF THE INVENTION

Accordingly, an object of this invention is to provide equipment and a method for management of terminal ID numbers in a communication system, which is constructed so that users of respective terminals are unable to arbitrarily alter their ID numbers, but a specific person like a person in charge of management of the system can easily carry out registration/alteration of the ID number when needed.

In accordance with the first aspect of this invention, there is provided equipment for management of terminal identification numbers in a communication system including a center and a plurality of terminals connected to the center, identification numbers of respective terminals registered in advance being attached to data communicating between the center and the respective terminals; each of the terminals comprising: terminal side memory means for registering the terminal identification numbers therein, initial identification numbers initially registered; means for communication with the center, for effecting data communication with the center; terminal erasing the initial identification numbers registered in the terminal side memory means to register the new terminal identification numbers and the center into the terminal side memory means; terminal side control means operative so that when an arbitrary one of the terminals is communicatably connected to the center, the control means delivers a predetermined registration request data to the means for communication with the center to allow the communication means to transmit it to the center, thereafter to permit the terminal side registration means to execute the registration of the terminal identification numbers only when a predetermined registration command from the center is received by the means for communication with the center; the center comprising: center side memory means for registering identification numbers of all terminals therein the initial identification numbers being initially registered with respect to all the terminals; means for communication with the terminals, for effecting data communication with the terminals; authorize means for giving, to the terminal, authorization of the registration of the terminal identification numbers at least on the condition that the registration request data from the terminal is received by the means for communication with the terminals; overlap check means for checking whether or not the terminal identification number to be registered and the other previously registered terminal identification numbers in the center side memory means overlap with each other; center side registration means for erasing the initial identification number registered in the center side memory means to register the terminal identification number to be registered when the authorization is given and a checked result indicative of no overlap is obtained from the overlap check means; and center side control means for transmitting the registration command through the means for communication with the terminals when the authorization is given and a checked result indicative of no overlapping is obtained from the overlapping check means, thereby permitting registration of the terminal identification number to be registered into the terminal identification memory means.

In accordance with the second aspect of this invention, there is provided equipment for the management of terminal identification numbers in a communication system including a center and a plurality of terminals connected to the center, identification numbers of respective terminals registered in advance being attached to data communicating between the center and respective terminals, each of the terminals comprising terminal side memory means for registering the terminal identification numbers therein initial identification numbers being initially registered; means for communicating with the center, for effecting data communication with the center; terminal side registration means for erasing the initial identification numbers initially registered in the terminal side memory means to register the terminal identification numbers; and terminal side control means for permitting the terminal side registration means to permit registration of the terminal side identification numbers only when a predetermined registration command from the center is detected by the means for communication with the center; the center comprising: center side memory means for registering identification numbers of all the terminals therein; means for communication with the terminals, authorize means including switch means manually operated and for giving, to the terminal, authorization of the registration of the terminal identification number at least on the condition that the switch means is turned on; overlap check means for checking whether or not the identification number to be registered and other previously registered terminal identification numbers in the center side memory means; center side registration means for erasing the initial identification number initially registered in the center side memory means to the terminal identification number to be registered when the authorization is given and a checked result indicative of no overlap is obtained from the overlap check means; and center side control means for transmitting the registration command through the means for communication with the terminals, thereby permitting registration of the terminal identification number to be registered into the terminal side memory.

In accordance with the third aspect of this invention, there is provided an equipment for the management of terminal identification numbers in a communication system including a center and a plurality of terminals connected to the center, identification numbers of respective terminals registered in advance being attached to data communicating between the center and the respective terminals, each of the respective terminals comprising terminal side memory means in which the terminal identification numbers are registered in advance; means for communication with the center, for effecting data communication with the center; code input means for inputting arbitrary codes, the input code being transmitted to said center through the means for communication with the center; terminal side registration means for rewriting the terminal discrimination number registered in the terminal side memory means to provide a new terminal identification number; terminal side control means for permitting rewrite operation by the terminal side registration means only when a predetermined registration command from the center is detected by the means for management with the center; the center comprising: center side memory means in which identification numbers of all terminals are registered in advance; means for communication with the terminals, for effecting data communication with the terminals, authorize means for giving, to the terminal, authorization of the rewrite operation of the terminal identification number at least on the condition that the code inputted from the code input means of the terminal and received by the means for communication with the terminals is in correspondence with a predetermined registration request code; overlap check means for checking whether or not the new identification number and other terminal identification numbers in the center side memory means; center side registration means for rewriting the terminal identification number registered in the center side memory means to provide the new terminal identification number when the authorization is given and a checked result indicative of no overlap is obtained from the overlap check means; and center side control means for transmitting the registration command to the terminal through the means for communication with the terminals thereby permitting rewrite operation at the terminal side memory means.

DESCRIPTION OF THE PREFERRED EMBODIMENTS

Figure 3:
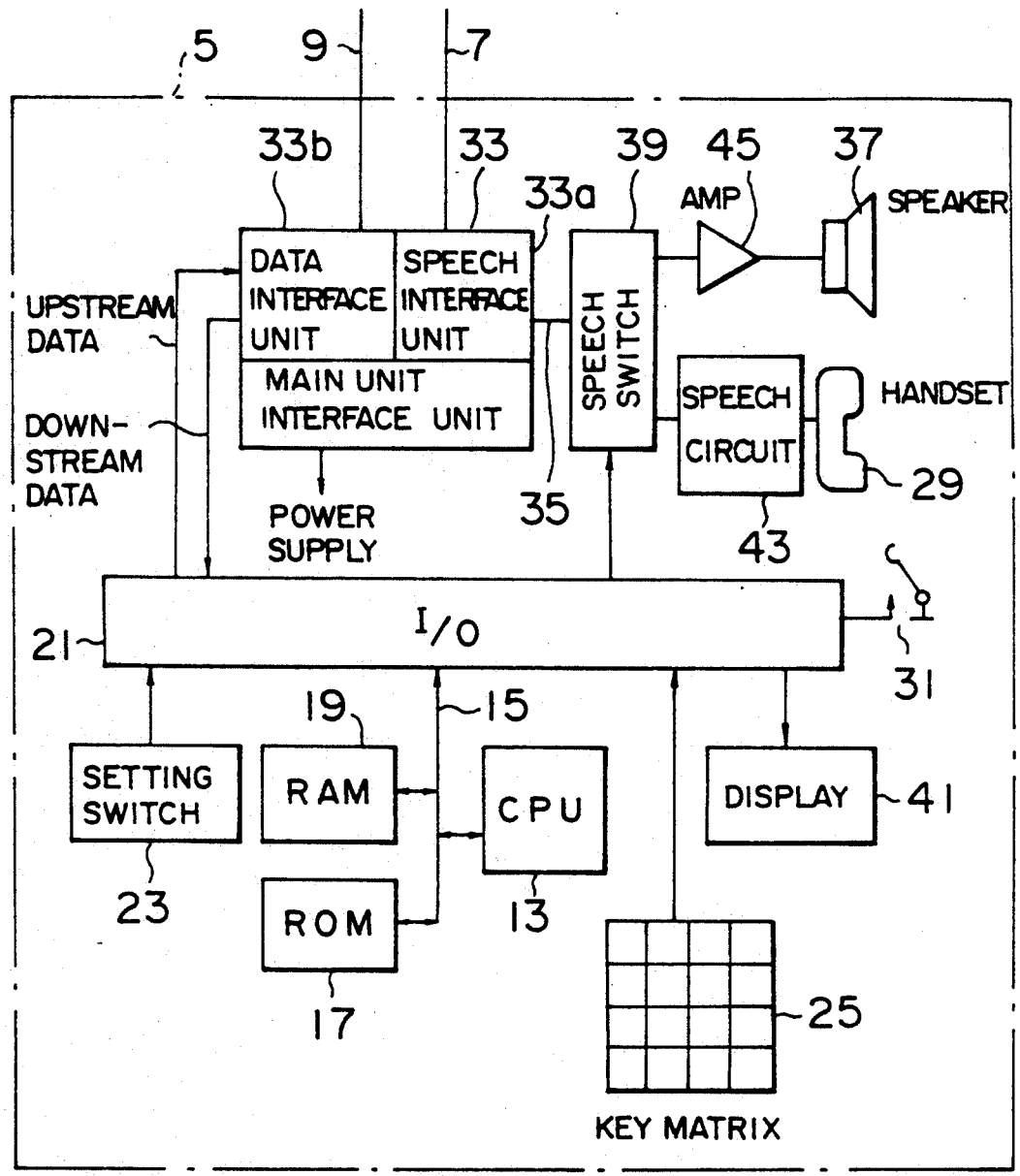
FIG. 3 is a block diagram showing a conventional terminal used in such a system as shown in FIG. 1.
Figure 4:
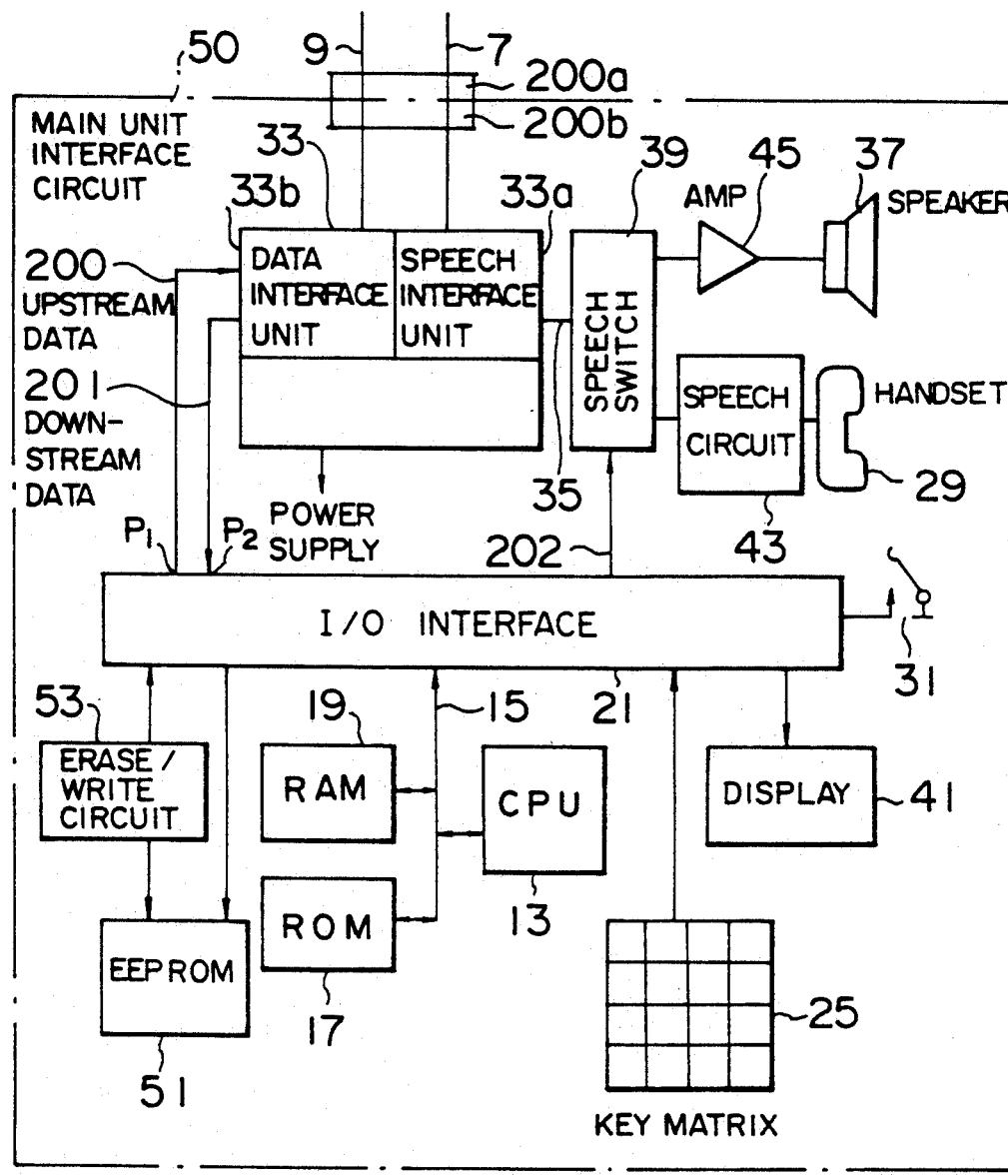
FIG. 4 is a block diagram of a terminal constituting an embodiment of equipment for management of terminal identification numbers in a communication system according to this invention.

Initially referring to FIG. 4, there is shown, in block form, the arrangement of an inside line terminal constituting an embodiment of a terminal identification number management equipment according to this invention. In this embodiment, the invention is applied to a push-button telephone system. In FIG. 4, the same components as those in FIG. 3 previously explained are designated by the same reference numerals and a repetitive explanation will be omitted.

The private or inside line terminal 50 according to this invention includes, in place of the setting switch 23 in the conventional terminal 5 in FIG. 3, an electrically rewritable non-volatile memory, e.g., an electrically erasable and programmable ROM (EEPROM) 51 for storing ID numbers (or a backed up RAM may be used), and an erase/write circuit 53 for erasing ID numbers in the EEPROM 51 and writing them thereinto. This erase/write circuit 53 is placed under control of the CPU 21 through the interface 13. Further, the EEPROM 51 is operative under control of the erase/write circuit 53 to store ID numbers delivered through the input/output interface 21 from the CPU 13, and to read out the ID numbers stored therefrom to send them to the CPU 13 through the input/output interface 21.

The control program stored in the ROM 17 includes a program for registration of ID numbers. In accordance with the content of this program, as described later, only when control data to the effect that registration is permitted is given from the main unit 1, it is permitted to write a new ID number into the EEPROM 51 and to transmit it as control data to the main unit 1.

Figure 1:
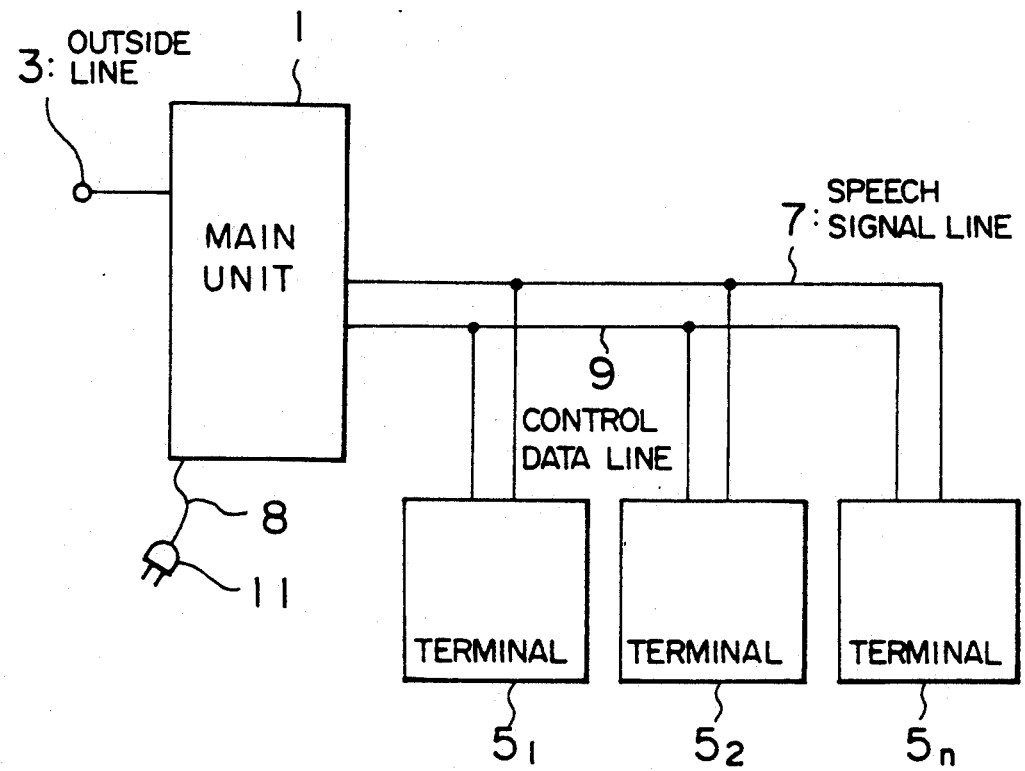
FIG. 1 is a block diagram of a typical telephone system including multi-connected terminals as the main unit.
Figure 2:
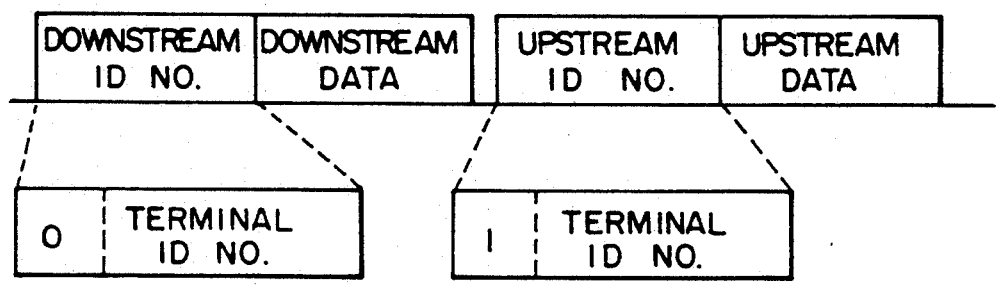
FIG. 2 is a view showing a typical format of data communicating between the main unit and the terminals in such a system as shown in FIG. 1.
Figure 5:
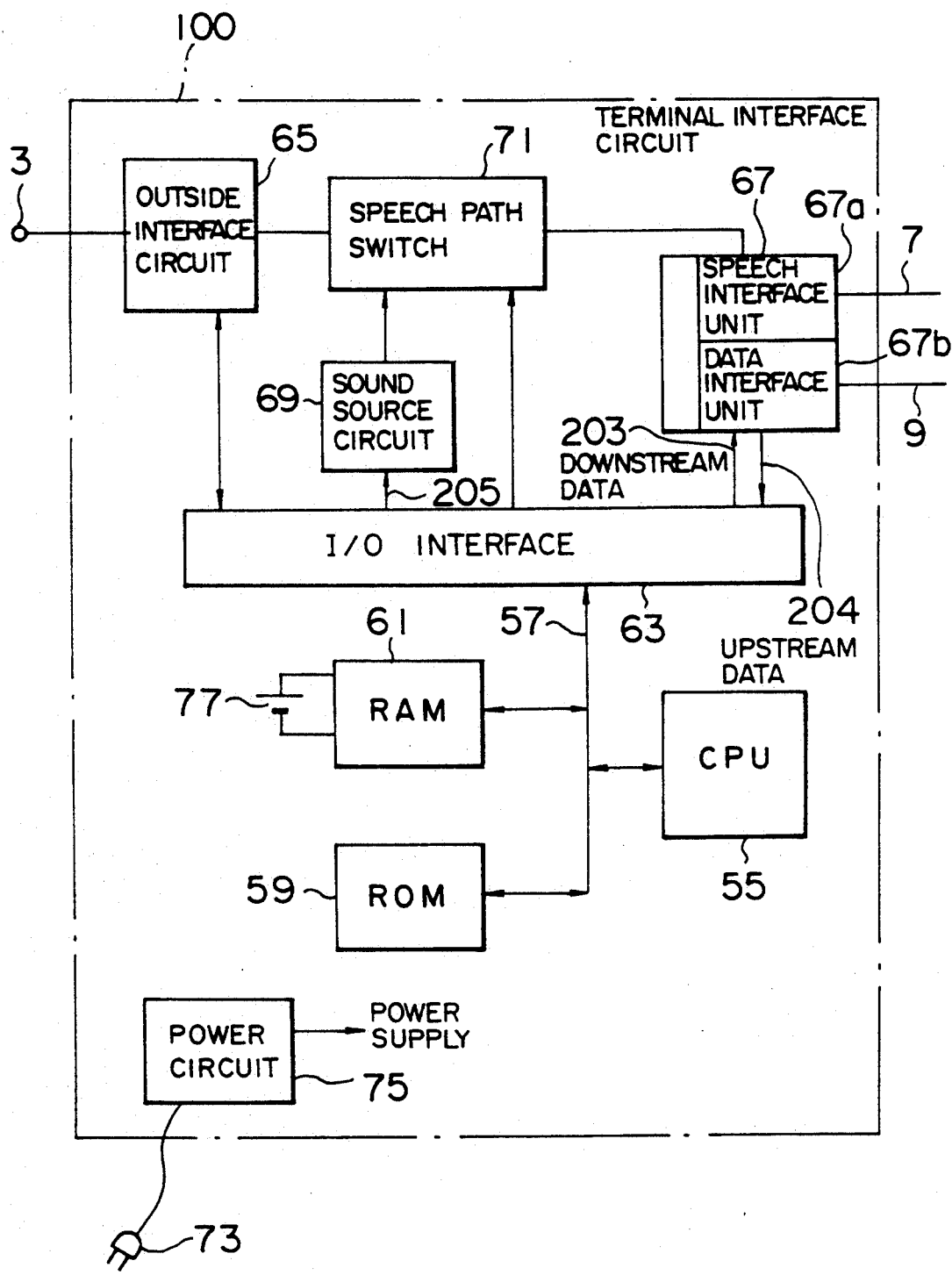
FIG. 5 is a block diagram of a push-button telephone main unit constituting the embodiment of this invention along with the terminal shown in FIG. 4, FIGS. 6A and 6B are views indicating how data communicate between the terminal shown in FIG. 4 and the main unit shown in FIG. 5 at the time of registration of ID numbers.

Referring to FIG. 5, there is shown, in a block form, the arrangement of the main unit 100 constituting this embodiment. In this embodiment, a plurality of terminals 50 are multi-connected as shown in FIG. 1.

This main unit 100 includes a CPU 55 for supervisory control of the entire operation of the system. This CPU 55 is connected through a bus 57 to a ROM 17 in which a control program is stored, a RAM 61 for storing various data (ID numbers, outside line regulation, charge for telephone call, etc.), and an input/output interface 63 for relaying transmission and reception of data to and from respective components in the main unit. This CPU 66 can transmit control data through the input/output interface 63 to an outside line interface circuit 65 for relaying communication with the outside line 3, a terminal interface circuit 67 for relaying communication with the terminal 50 multi-connected to the main unit 100 through the speech signal line 7 and the control data line 9 and delivering a drive power to the terminal, a sound source circuit 69 for generating various state discriminating tones (dial tone, ring-back tone, beep tone, holding tone, etc.), and a speech path switch 71 for exchanging a speech signal between these circuits 65, 67, 69, and receive control data from the outside line interface circuit 65 and the terminal interface circuit 67. These circuits operates when it is supplied with a d.c. power from a power supply circuit 75 connected to the power supply of AC 100 V by the connector 73.

The terminal interface circuit 67 includes a speech interface unit 67a connected to the speech signal line 7 from the terminal 50, and a data interface unit 67b connected to the control data line 9. The upstream data from the terminal 50 is received by the data interface unit 67b and is then sent to the CPU 55 through the input/output interface 63. The control data for the terminal 50 outputted from the CPU 55 is transmitted to the data interface unit 67b through the input/output interface 63 and is then sent as the downstream data to the control data line 9.

A program constructed to permit an ID number sent from the terminal 50 to be registered only when a predetermined code is transmitted in advance from the terminal 50 is stored in the ROM 59. The ID number is transmitted as the control data from the terminal 50 to the main unit 100. This ID number is inputted to the CPU 55 through the input/output interface 63 from the data interface unit 67b. Where a predetermined code is inputted from the terminal 50 prior to inputting of the ID number, the CPU 55 stores the inputted ID number into an area for registration of ID number assigned to the terminal 50 in the RAM 61. The RAM 61 is backed up by the battery 77 at the time of service interruption. Thus, the contents registered are protected.

The operation in setting an ID number in this embodiment will now be described with reference to the block diagrams shown in FIGS. 4 and 5 and the diagrams of data communication between the main unit 100 and the terminal 50 shown in FIGS. 6A and 6B. FIG. 6A shows the communicating operation where registration is normally conducted, and FIG. 6B shows the communicating operation where there has occurred the possibility that overlapping registration may be conducted. In this embodiment, the ID number has three figures or digits. In FIG. 6, indication of the control procedure using a communication control character such as ENQ, ACK, etc. is omitted.

As the registration of ID numbers, a registration is carried out at the time of installation of a new telephone system and a registration carried out at the time of alteration of the telephone system already used. In the case of registration carried out at the time of installation, ordinarily, all terminals 50 are assumed to be initially set to the same ID number (e.g., "000") at the time of forwarding from the factory. Accordingly, when an attempt is made to connect a plurality of terminals 50 to the main unit 100 at the same time to make a registration, the main unit 100 cannot identify respective terminals 50. As a result, confusion would occur. For this reason, the registration at the time of installation is made in a manner to connect respective terminals 50 in order one by one to the main unit 1000, i.e., to complete registration of one terminal 50 thereafter to connect the next terminal 50. On the other hand, in the case of the registration at the time of alteration of the system in use, since respective terminals 50 are already set to different ID numbers, registration can be made under the state where all the terminals 50 are connected to the main unit 100. In either case, the operation of the registration every respective terminals 50 is as follows.

The case where the registration is normally carried out will be first described.

Initially referring to FIG. 4, in the key matrix of the terminal 50, a code of a registration mode setting request, e.g., "*#*#*#" is dialed and a code of an ID number registration request, e.g., "123456" is then dialed. These dial data "*#*#*#" and "123456" are detected by the CPU 13. Then, they are sent through the I/O interface 21 to the main unit interface circuit 33 along with an upstream ID number "1123" based on a current ID number which has been read out from the EEPROM 51, e.g., "123". Thus, as shown in FIG. 6A, both dial data "*#*#*#" and "123456" to which the upstream ID number "1123" based on the current ID number "123" is added are transmitted to the main unit 100.

Referring to FIG. 5, in the main unit 100, both dial data "*#*#*#" and "123456" are inputted to the CPU 55 along with the ID number "123". Thus, the CPU 55 makes a collation between the inputted ID number "123" and ID numbers of respective terminals set at present in the RAM 61 to thereby recognize which terminal has sent these data. Then, the CPU 55 recognizes that the registration mode setting request has been made by the input data "*#*#*#". Subsequently, the CPU 55 collates the input data "123456" with an ID number registration request code "123456" determined in advance in the RAM 61. It is to be noted that, as the ID number registration request code an arbitrary code may be set. As a result of the fact that the input data "123456" and the ID number registration request code "123456" are in correspondence with each other, the CPU 55 recognizes that the ID number registration request has been made, and is then switched to the ID number registration mode. When the ID number registration mode is set, a predetermined registration enable data is transmitted to the terminal interface circuit 67 along with the downstream ID number "0123" based on a current ID number of the terminal 50 which has been read out from the RAM 61. Thus, as shown in FIG. 6A, registration permissible data having at its first position the downstream ID number "0123" based on a current ID number "123" is transmitted to the terminal 50.

Referring to FIG. 1, the terminal 50 makes a collation between the ID number "123" attached to the registration enable data received by the CPU 13 and a current ID number "123" from the EEPROM 51. As a result, when the both ID codes are in correspondence with each other, the terminal 50 recognizes that the data concerned is the downstream data for the terminal belonging to itself to control the display 41 to allow it to effect the display to the effect that the permission of registration has been made (e.g., display of liquid crystal or lighting of an LED).

Then, a new ID number, e.g., "789" is dialed in the key matrix 25 of the terminal 50. This dial data "789" is inputted to the CPU 13. The CPU 13 writes a new ID number "789" into a predetermined area of the RAM 19. In addition, this new ID number "789" is transmitted through the I/O interface 21 to the main unit interface circuit 33 along with upstream ID number "1123" based on a current ID number from the EEPROM 51. Thus, as shown in FIG. 6A, the upstream number "1123" based on the current number as the control data is added to the first position of the new ID number "789". The ID number added control data is transmitted to the main unit 100.

Referring to FIG. 5, in the main unit 100, the received new ID number "789" is inputted to the CPU 55 along with the current ID number "123" added to its first position Thus, the CPU 55 collate the ID number "123" at its first position with ID numbers of respective terminals from the RAM 61 to identify which terminal this upstream data has sent. Then, the CPU 55 collates the new ID number "789" with ID numbers of respective terminals from the RAM 61 to check whether or not the above ID number overlap with ID numbers of other terminals. As a result, when there is no overlap, a predetermined registration command data is transmitted to the terminal interface circuit 67 along with the downstream ID number "0123" based on a current ID number. Thus, as shown in FIG. 6A, the downstream ID number "0123" based on the current ID number is added to the first position of the registration command data. The ID number added data is transmitted to the terminal 50.

Referring to FIG. 4, in the terminal 50, upon receiving the registration command data, the CPU 13 drives the erase/write circuit 53 to erase the current ID number "123" in the EEPROM 51 thereafter to read out a new ID number "789" stored in the RAM 19 to write it into the EEPROM 51. Then, a predetermined write completion data is transmitted to the main unit interface circuit 33 along with the upstream ID number "1789" based on the new ID number "789". Thus, the upstream ID number "1789" based on the new ID number is added to the first position of the write completion data. The ID number added data is transmitted to the main unit 100.

Referring to FIG. 5, in the main unit 100, after the above-described registration command data has been transmitted, the CPU 55 rewrites the current ID number "123" of the terminal 50 in the RAM 61 into a new ID number "789". Thereafter, the CPU 55 receives the write completion data from the terminal 50. Thus, the CPU 55 recognizes that registration of the ID number "789" has been completed to return its operational mode from the registration mode to a normal mode, and to transmit registration mode release data to the terminal as shown in FIG. 6A. The CPU 13 of the terminal 50 responds to the registration mode release data to release the registration enable display on the display 41. Thus, the CPU 13 is returned to a normal call incoming standby mode.

The operation in the case where there occurs the possibility that overlapping registration may be made will now be described.

Referring to FIG. 6B, the new ID number "789" is transmitted from the terminal 50 to the main unit 100. The operation until overlapping with other ID numbers in the RAM 61 is checked by the CPU 55 is the same as that of FIG. 6A. Referring to FIG. 5, when the CPU 55 finds out that ID numbers overlap with each other, a predetermined overlapping registration disable data is transmitted to the terminal interface circuit 67 along with the downstream ID number "0123" based on a current ID number of the terminal 50. Then, the CPU 55 sends a command to the sound source circuit 69 to output a registration disable alarm tone (e.g., a tone like "pi, pi, pi . . ."), and to control the speech path switch 71 to send the registration disable alarm tone to the terminal interface circuit 67. Thus, as shown in FIG. 6B, downstream ID numbers "0123" are added to respective first positions of the overlapping registration disable data and the registration disable alarm tone data. These ID number added data are transmitted to the terminal 50.

Referring to FIG. 1, in the terminal 50, the CPU 13 responds to the overlapping registration disable data to allow the display 41 to conduct a display to that effect (e.g., liquid crystal display, turning on and off of LED), e.g., for three seconds, and to switch the speech switch 39 to the speaker 37 side during that period to output a registration disable alarm tone from the speaker 37. Thereafter, when a different new ID number, e.g., "890" is dialed for a send time from the key matrix 25, the CPU 13 rewrites the ID number "789" in the RAM 19 into the newly dialed ID number "890". This new ID number "890" is transmitted to the main unit interface circuit 33 along with the ID number "1123" based on a current ID number. Thus, as shown in FIG. 6B, the upstream ID number "1123" is added to the first position of the new ID number "890" as the control data. The data thus obtained is transmitted to the main unit 100.

Thereafter, if the new ID number "890" does not overlap with other ID numbers, processing proceed in the same manner as in the case where registration is normally made as previously explained. Thus, the new ID number "890" is registered.

As stated above, in accordance with this embodiment, only when a code equal to ID number registration request codes "123456" arbitrarily set in advance is transmitted in advance from the terminal 50 to the main unit 100, registration enable data is outputted from the main unit 100. Thus, registration of new ID numbers can be made. Accordingly, only a specific person who is aware of the ID number registration request code "123456" can make registration of ID numbers. Thus, it can be prevented that an ordinary user who is not aware of the above code arbitrarily alters the ID number. Further, since an easily rewritable EEPROM 51 is used as the memory for registering ID numbers in the terminal 50, work for altering ID numbers is easy. It is to be noted that a backed up RAM may be used in place of the EEPROM 51.

Figure 7:
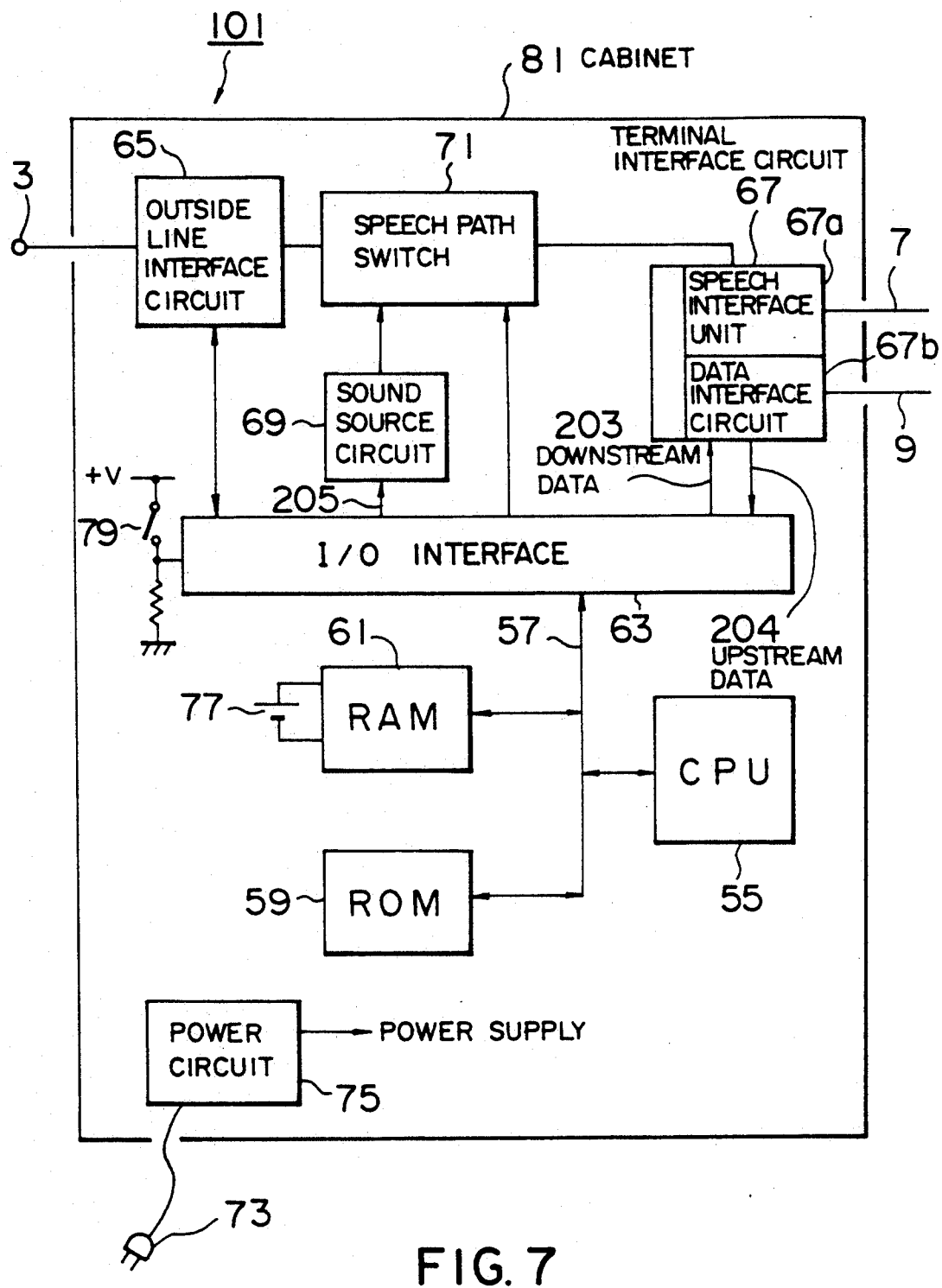
FIG. 7 is a block diagram of a main unit constituting another embodiment of this invention along with the terminal shown in FIG. 4, FIGS. 8A and 8B are views indicating how data communicate between the terminal shown in FIG. 4 and the main unit shown in FIG. 7 at the time of registration of ID numbers.

FIG. 7 is a block diagram showing the arrangement of a push-button telephone main unit constituting another embodiment of this invention wherein the same components as those in FIG. 5 are designated by the same reference numerals, respectively.

The main unit 101 differs from the main unit shown in FIG. 5 in that an ID number registration switch 79 is provided. This switch 79 is constructed so that it can be manually turned on and off to deliver a logic signal which shows a high level in an on state and low level in an off state to the CPU 55 through the input/output interface 63. The CPU 55 is programmed so that it does not acknowledge receipt of an ID number registration request from the terminal except for a time period during which the switch 79 is turned on. The ID number registration switch 79 is provided within a cabinet 81 of the main unit 101 and is constructed so that an ordinary user cannot arbitrarily operate the switch 79 since the switch 79 cannot be operated unless the cabinet is opened. As an alternative form, the registration switch 79 may be locked with a lock cylinder which can be released only by a special key.

A plurality of terminals 50 shown in FIG. 4 is connected to the main unit 101.

In this embodiment, the cabinet of the main unit 101 is opened to allow the ID number registration switch 79 to be turned on thereafter to conduct a registration operation similar to the previous embodiment at the terminal 50. Thus, registration of ID numbers is carried out. When all necessary registrations have been completed, the ID number registration switch 79 is turned off. The cabinet of the main unit 101 is then closed and is further locked when desired. Thus, an ordinary user makes it impossible to arbitrarily alter the ID number.

It is to be noted that when an approach is employed in this embodiment such that the main unit 101 is brought into the registration in response to on state of the ID number registration switch 79 and the registration mode is released in response to off state thereof, input of the dial data "*#*#*#" and "123456" from the terminal 50 in the ID number registration operation shown in FIG. 3, and the processing for collation between the dial data "123456" and the ID number registration code "123456" may be omitted.

Further, an approach may be employed in this embodiment to carry out the ID number registration at the time of altering the system content during working in the same manner as that in the previous embodiment, and to use the ID number registration switch 79 only when carrying out registration of the initial ID number at the time of installation of the system. An example of the operation for registering the initial ID numbers in that case will be described with reference to the block diagrams shown in FIGS. 4 and 7 and the chart of signal communication between the terminal 50 and the main unit 101 shown in FIGS. 8A and 8B. It is to be noted that an indication of the control procedure using the communication control character such as ENQ, ACK, etc. is omitted in FIG. 8.

It is assumed here that ID numbers "000" are equally set in the respective terminals 50 at the time of forwarding from the factory, and that the main unit 101 permits only the terminal 50 having the ID number "000" to register the initial ID number.

Figure 8A:
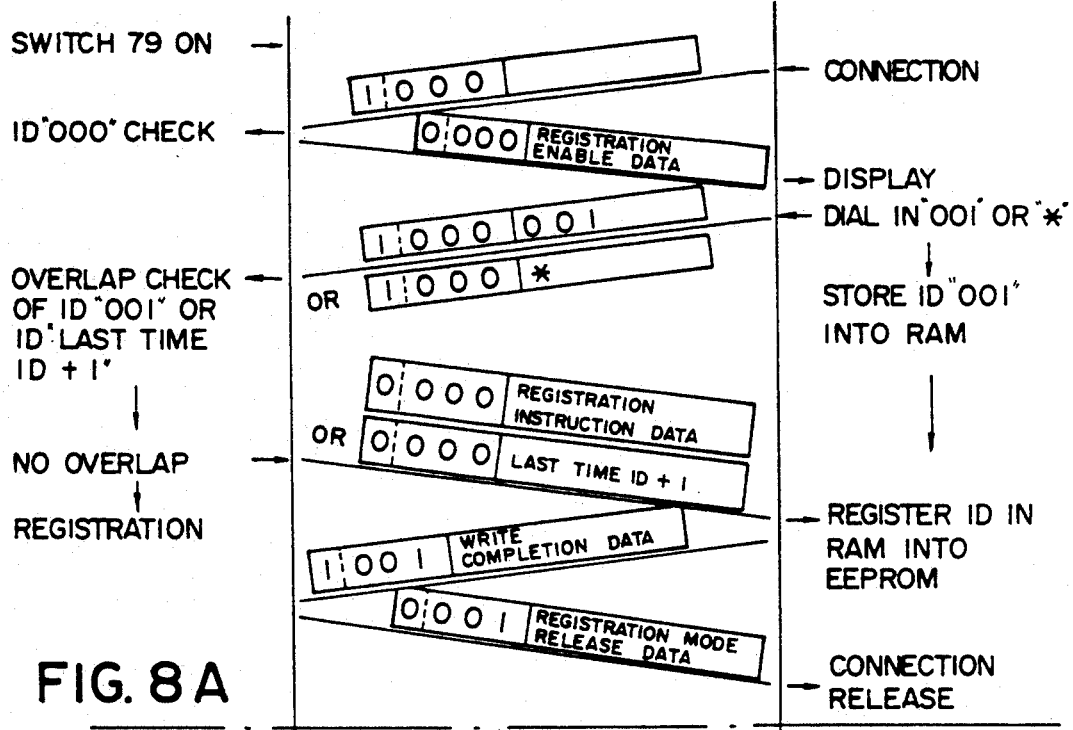

The operation in the case where an ID number is normally registered will be first described with reference to FIGS. 4, 7 and 8A. Initially, after it is confirmed that any one terminal is not connected to the main unit 101, the ID number registration switch 79 of the main unit 101 is turned on. Upon detection of input of a high level signal from the switch 79 through the input/output interface 63, the CPU 55 of the main unit 101 is switched into the registration mode for the initial ID number.

Then, one terminal 50 is connected to the main unit 101. This terminal initiates the operation when it is supplied with a power from the terminal interface circuit 67 of the main unit 101. Initially, the ID number "000" in the ROM 51 is read out. An upstream ID number "1000" is prepared on the basis of the ID number "000" thus read, and is then transmitted to the main unit 101.

In the main unit 101, the CPU 55 discriminates the ID number "000" transmitted from the terminal 50. When it is confirmed that this ID number corresponds to the ID number "000" at the time of forwarding from the factory, registration enable data having at its first position the downstream ID number "0000" as shown in FIG. 8A is transmitted to the terminal 50.

In the terminal 50, the CPU 13 receives the registration enable data from the main unit 101 to allow the display 41 to effect a display to the effect of registration enable. Then, when an ID number to be registered, e.g., "001" is dialed from the key matrix 25, the upstream ID number "1000" is added to the first position of the ID number "001". The ID number thus modified is transmitted to the main unit 101. After this transmission, the new ID number "001" is written into the RAM 19.

If an ID number that a user wishes to register is equal to the ID number of a terminal which has been already registered plus "1" (this would be ordinary in the case of registration of the initial ID number), a desired operation may be performed if, e.g., "*" is only dialed instead of a new ID number in order to simplify the input operation for the ID number. In that case, an upstream ID number "1000" is added to the first position of this dial data "*", and the data thus modified is transmitted to the main unit 101.

In the main unit 101, the CPU 55 receives an ID number "001" desired to be initially registered which has been transmitted from the terminal 50 to check whether or not this ID number overlap with other ID numbers. As a result, when there is no overlap, a registration command data having an ID number "0000" added at its first position is transmitted to the terminal 50. Thereafter, an ID number desired to be initially registered, e.g., "001" is written into an area for registration of ID number corresponding to the terminal 50 in the RAM 61.

In the terminal 50, the CPU 13 responds to the registration command data from the main unit 101 to write the ID number in the RAM 19 into the EEPROM 51. After completion of the write operation, write completion data having an upstream ID number "1001" based on the registered ID number "001" added at its first position is transmitted to the main unit 101.

Further, where data "*" is transmitted from the terminal 50, the CPU 55 of the main unit 101 adds "1" to the ID number registered last time to consider this ID number as an ID number desired to be initially registered, thus to carry out an overlap check thereof in a manner similar to the above. As a result, when there is no overlapping, the ID number desired to be initially registered is initially registered into an area for registration of ID number corresponding to the terminal 50 in the RAM 61, and is transmitted to the terminal 50. The terminal 50 receives an ID number from the main unit 101 to write it into the EEPROM 51, and transmit the write completion data to the main unit 101 after completion of the write operation.

In the main unit 101, upon receiving the write completion data, the CPU 55 releases the ID number registration mode and transmits, to the terminal 50, the registration mode release data having the downstream ID number "0001" based on the set ID number "001" added at its first position. Upon receiving this data, the terminal 50 releases the registration enable display on the display 41.

Thereafter, the terminal 50 in which registration has been completed is detached from the main unit 101, and the next terminal is connected to the main unit 101. The registrating operation similar to the above is performed. Thus, respective terminals 50 are connected in order one by one to the main unit 101. Registrating operations of respective ID numbers are performed. After registering operations of all the terminals 50 have been completed, all the terminals 50 are multiconnected to the main unit 101, and enter working of the system.

Meanwhile, where an ID number overlaps with other previously registered ID numbers in the overlapping of ID numbers in the above-described registration process, the overlapping registration disable data and an alarm tone are transmitted from the main unit 101 to the terminal 50 in a manner similar to the operation in the case of the overlapping registration previously explained with reference to FIG. 6B. Then, a different ID number is newly dialed from the terminal 50.

Figure 8B:
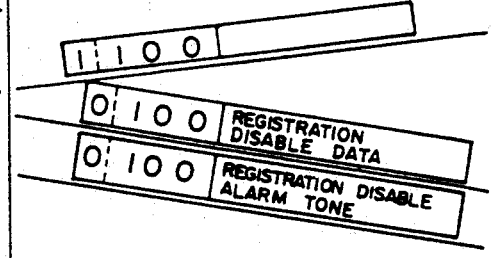

FIG. 8B shows the operation in the case where the terminal 50 having an ID number, e.g., "100" different from the ID number "000" at the time of forwarding from the factory is connected to the main unit 101.

In this case, an upstream ID number "1100" is transmitted from the connected terminal 50 to the main unit 101. When the CPU 55 of the main unit 101 recognizes that the transmitted ID number "100" is different from the ID number "000" at the time of forwarding from the factory, it transmits, to the terminal 50, registration disable data and registration disable alarm tone having downstream ID numbers "0100" added to their respective first positions.

In the terminal 50, the CPU 13 responds to registration disable data to allow the display 41 to carry out a display to the effect of inhibition of registration, and to output a registration disable alarm tone to the speaker 37. Thereafter, this terminal 50 is detached from the main unit 101, and a different terminal under the state of forwarding from the factory is newly connected to the main unit 101. Registering operations similar to the above will be repeated for a second time.

Figure 9:
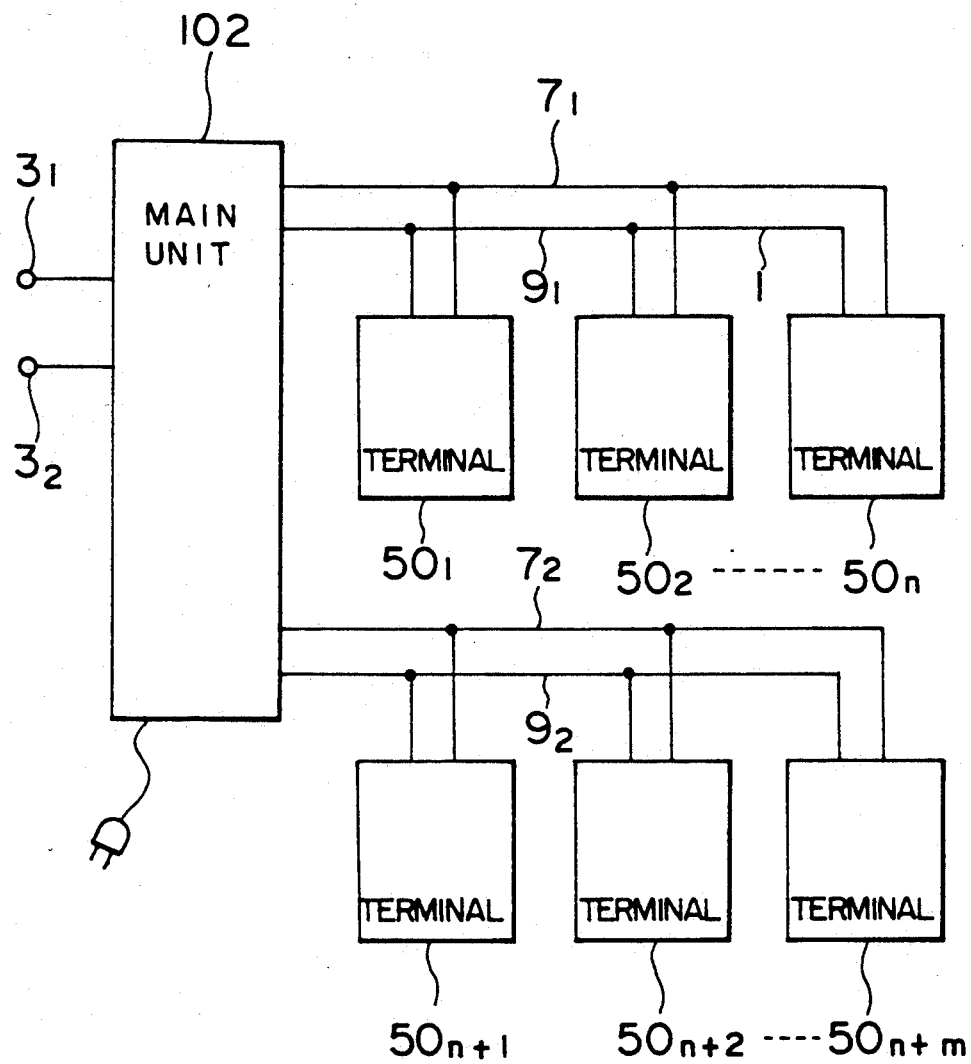
FIG. 9 is a block diagram of a telephone system including a plurality of multi-connected terminal systems.

While the terminals of one system are multiconnected to the main unit in the above-described two preferred embodiments of this invention, this invention may be applied to the system including multiconnected terminals of two systems or more as shown in FIG. 9.

In the operation for setting ID numbers in such a system including a plurality of multiconnected terminals, it is desirable to set different ID numbers at all terminals $50_1, 50_2, \ldots 50_n, 50_{n+1}, 50_{n+2}, \ldots 50_{n+m}$, respectively. When such a setting is made, even if, e.g., terminal $50_1$ of one system is exchanged with terminal $50_{n+1}$ of the other system, the system configuration may be used without altering the ID number. In addition, even in the case where the outside line communication regulation, etc. is imposed on, e.g., the terminal $50_1$, that regulation can effectively still function even if the terminal $50_1$ is moved to a different terminal system.

Figure 10:
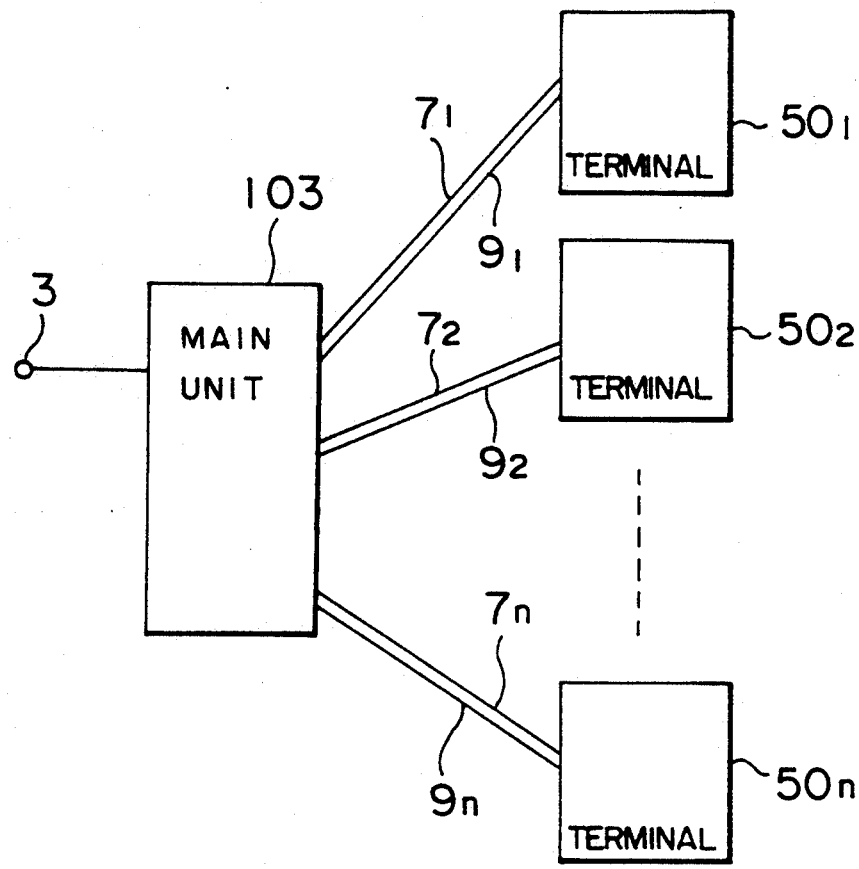
FIG. 10 is a block diagram of a telephone system in which terminals are star-connected to the main unit.

FIG. 10 shows a system where terminals $50_1, 50_2, \ldots, 50_n$ are star-connected to the main unit 103 in place of multiconnection. This invention may be also applied to such a system. Where the terminals are star-connected, there is, in principle, no need to discriminate terminals by the ID numbers assigned thereto. However, when the system of discrimination by ID numbers is employed, even in the case where, e.g., terminals $50_1$ and $50_n$ are exchanged, there is no necessity of altering the inside line numbers (which are the same as the ID numbers or correspond thereto with one-to-one correspondence, respectively). This is convenient.

Figure 11:
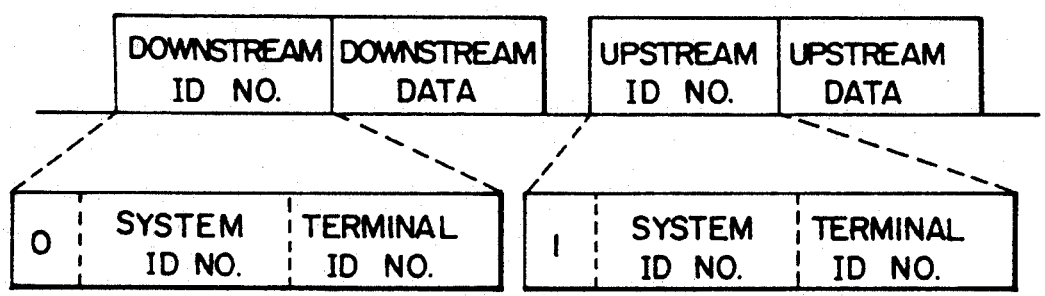
FIG. 11 shows a data format of data communicating between the main unit and the terminals, having ID numbers of the system as the upstream and downstream ID numbers.

An example of a format different from that of the above-described embodiment of upstream and downstream ID numbers is shown in FIG. 11.

In this format example, ID numbers of the system are included in the upstream and downstream ID numbers. These system ID numbers are set, e.g., at the time of forwarding from the factory or at the time of installation every main units. By using such a format, when an attempt is made to bring the terminals of a system different from the subject system to arbitrarily connect such terminals to the subject system to use them, one cannot use them. Accordingly, this advantageously makes it possible to keep the security between systems.

In the case of using such a format, the system ID numbers may be registered, e.g., in a manner described below. Initially, system ID numbers are set in advance in the ROM 59 or the RAM 61 provided in the main unit 100 (or 101). In the operation for registering terminal ID numbers shown in FIG. 6 (or FIG. 8), in transmitting the registration command data for ID number from the main unit 100 (or 101) to the terminal 50, system ID numbers are transmitted to the terminal 50 at the same time and are then registered into the EEPROM 51 of the terminal 50.

Figure 12:
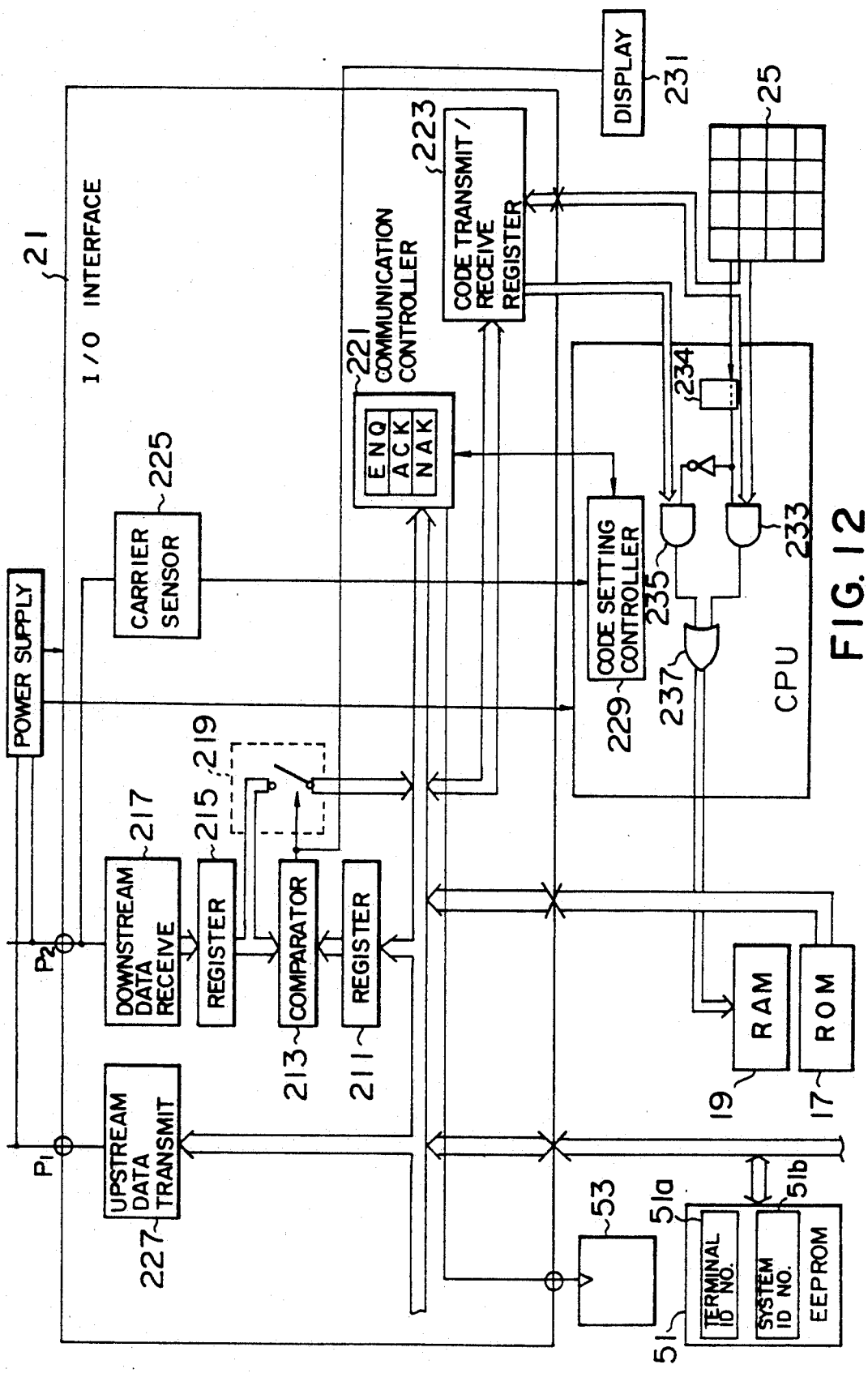
FIG. 12 is a block diagram of the principal part of the terminal shown in FIG. 4.
Figure 13:
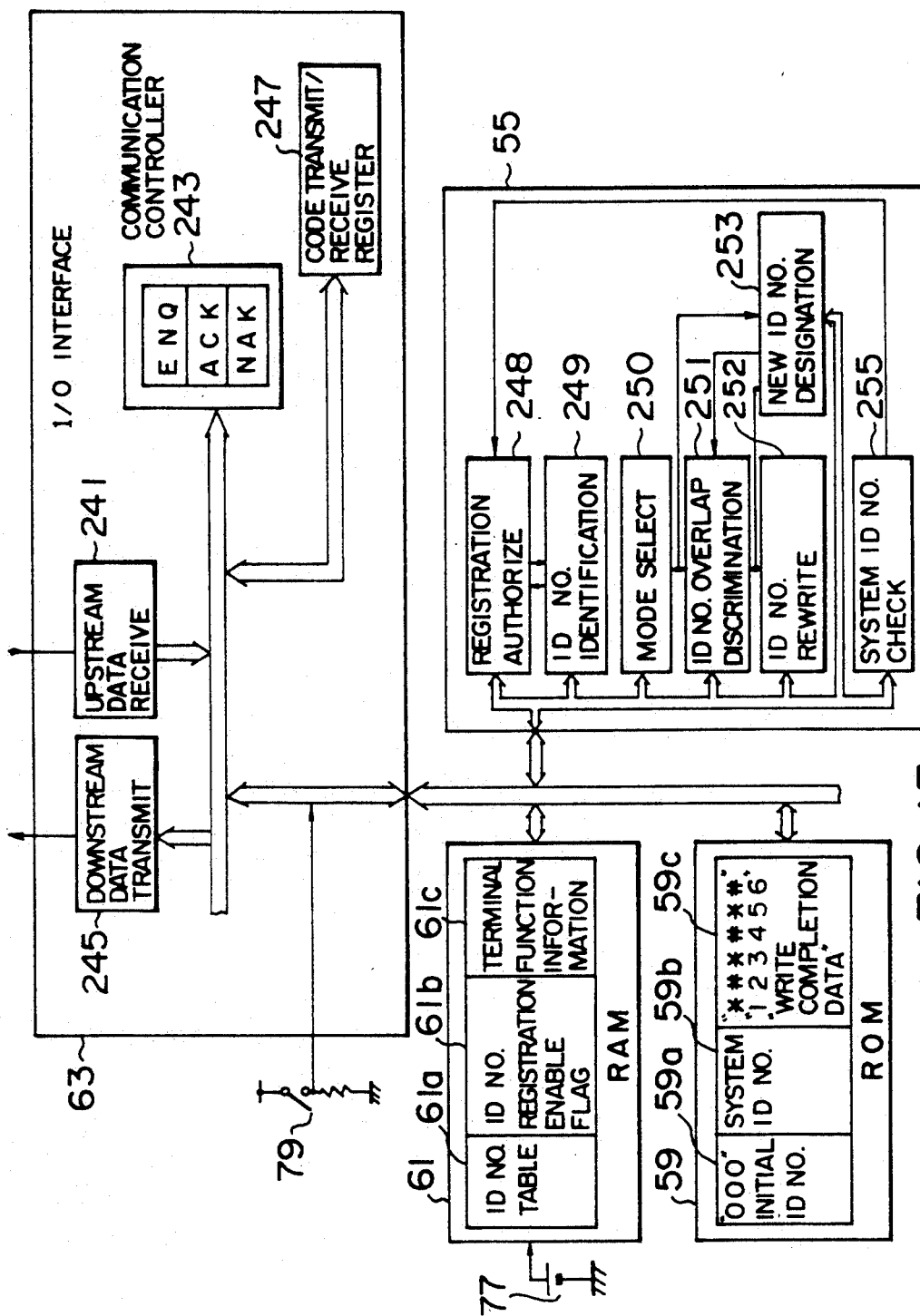
FIG. 13 is a block diagram of the principal part of the terminal shown in FIG. 7, FIGS. 14A to 14D are flowcharts showing the processing by the terminal shown in FIG. 4 at the time of initial ID numbers.
Figure 14A:
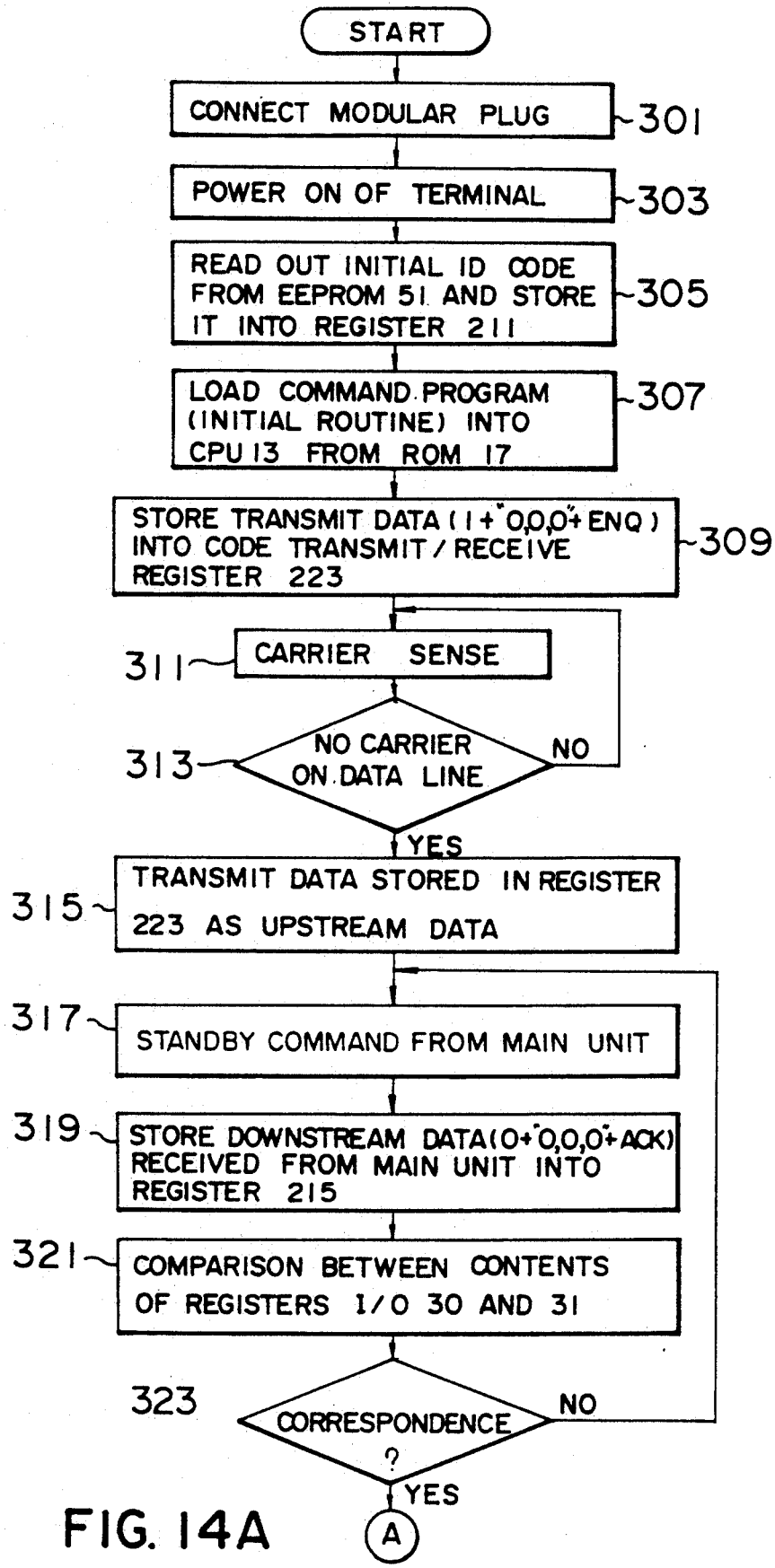
Figure 14B:
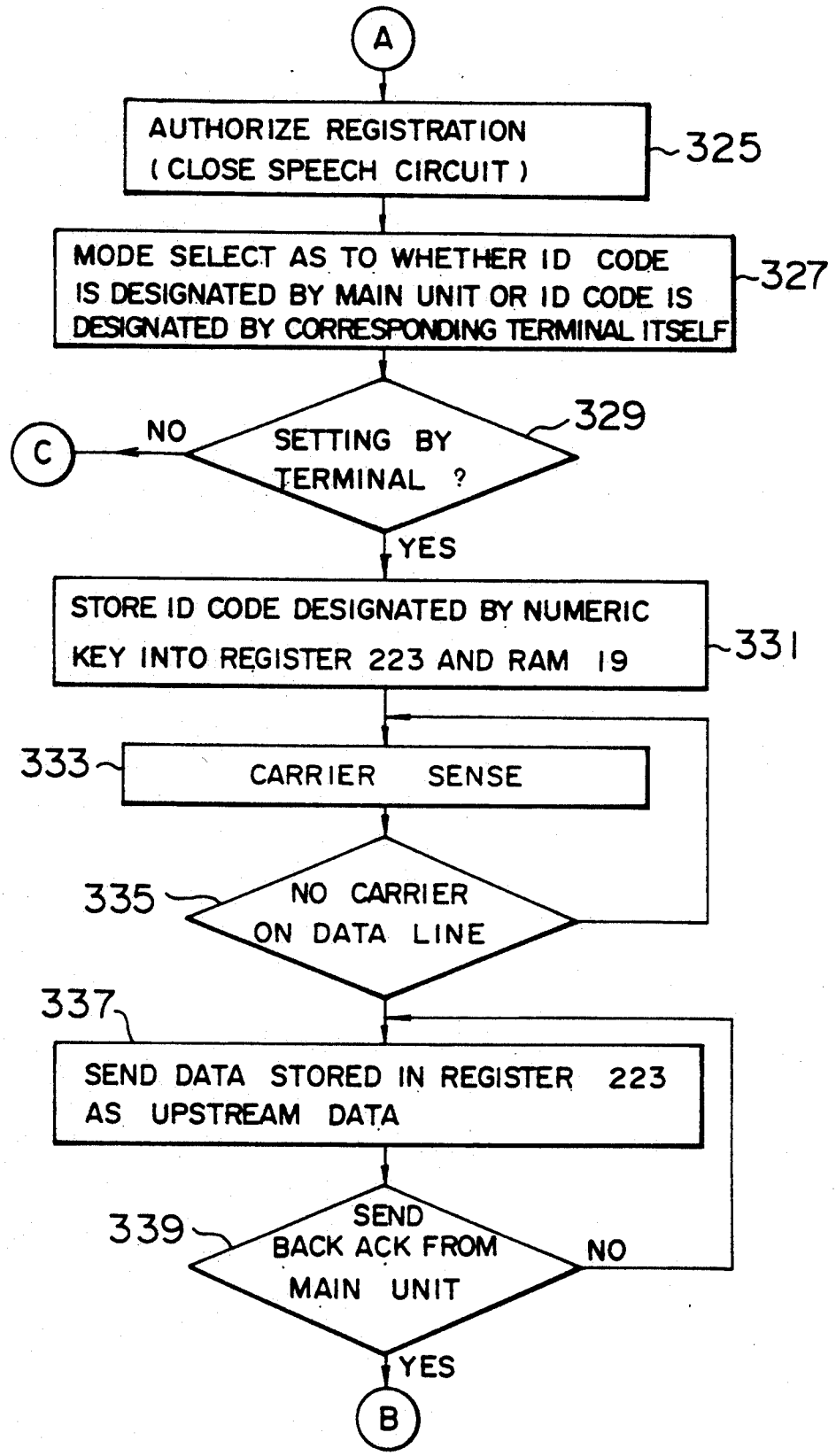
Figure 14C:
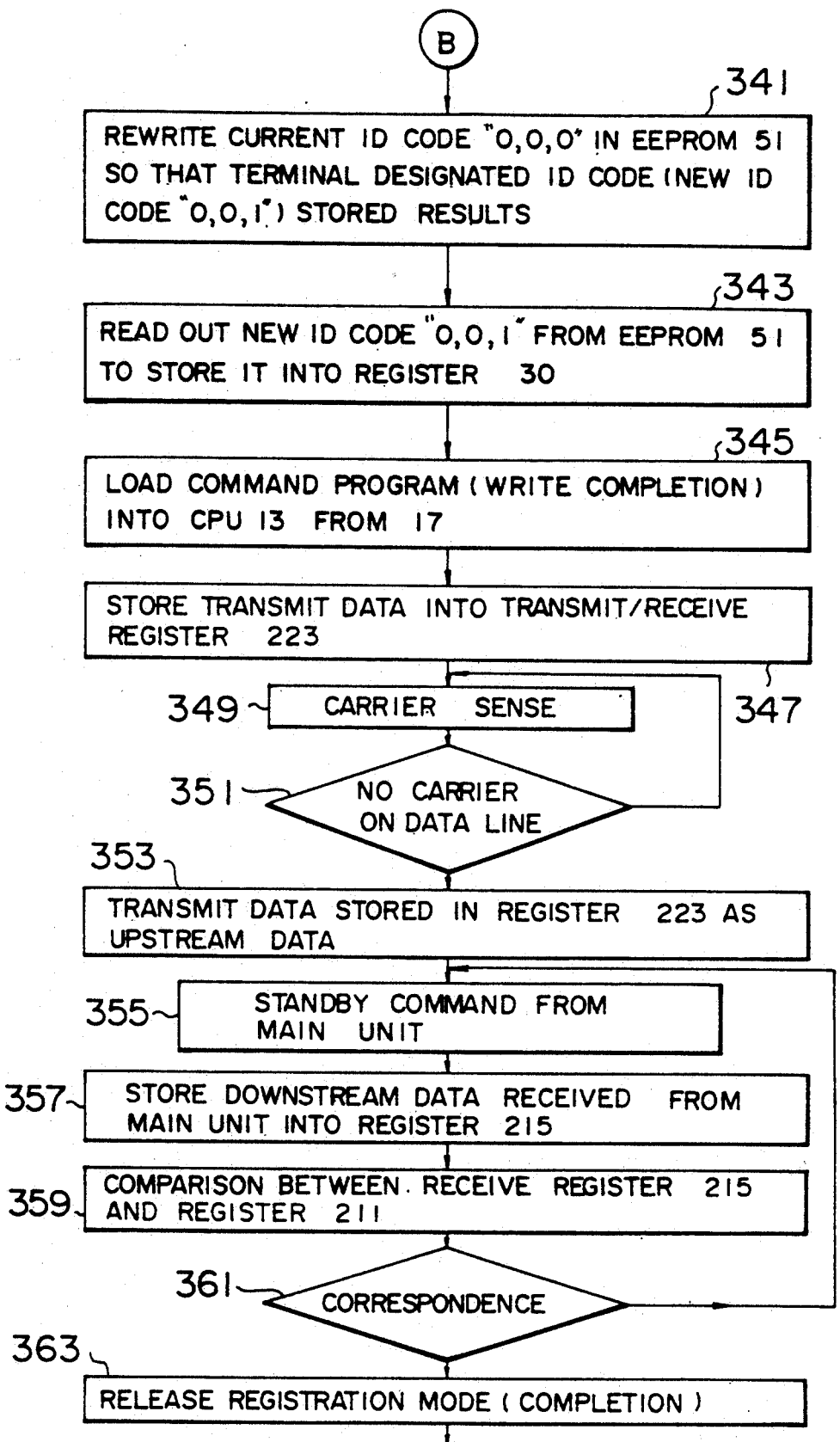
Figure 14:
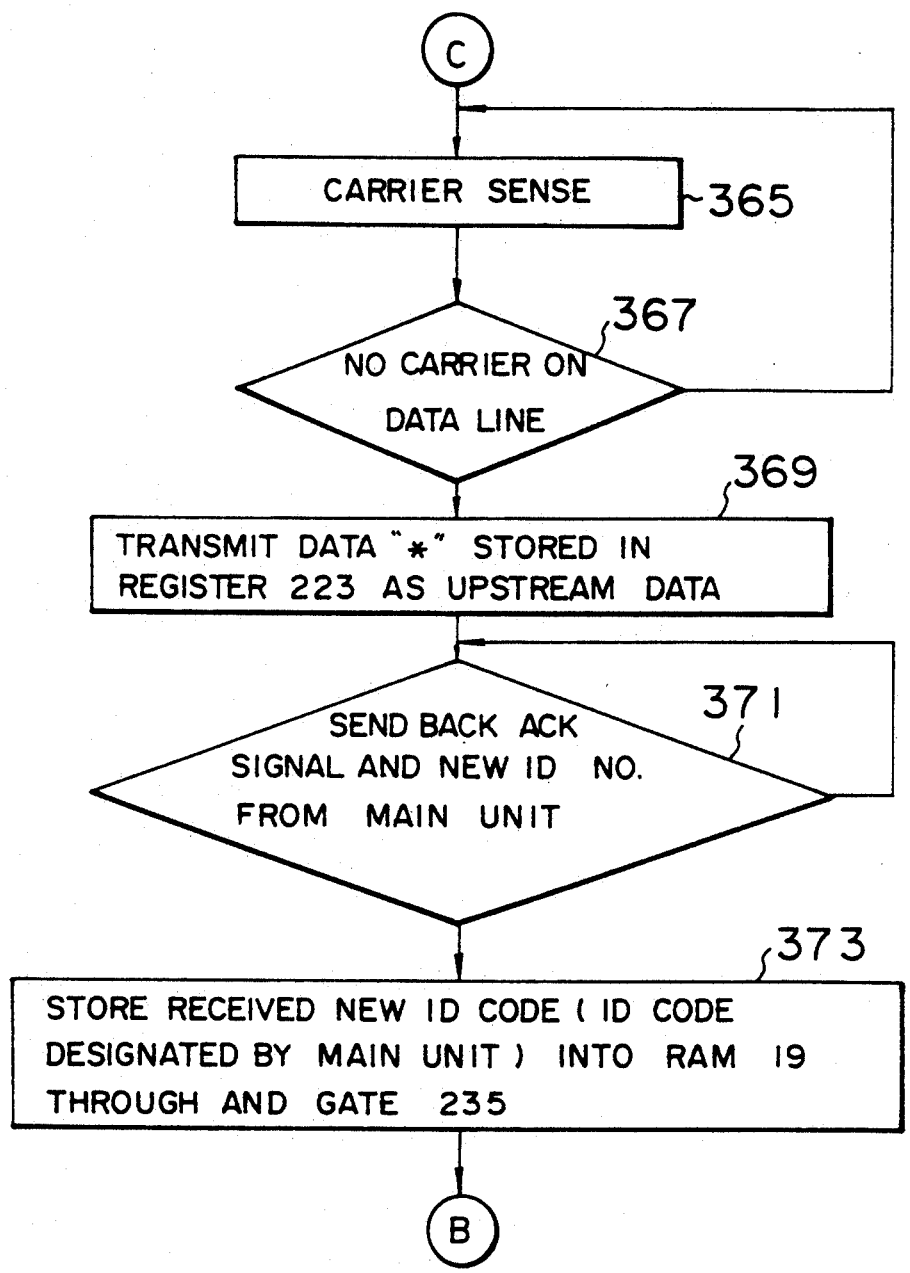
Figure 15A:
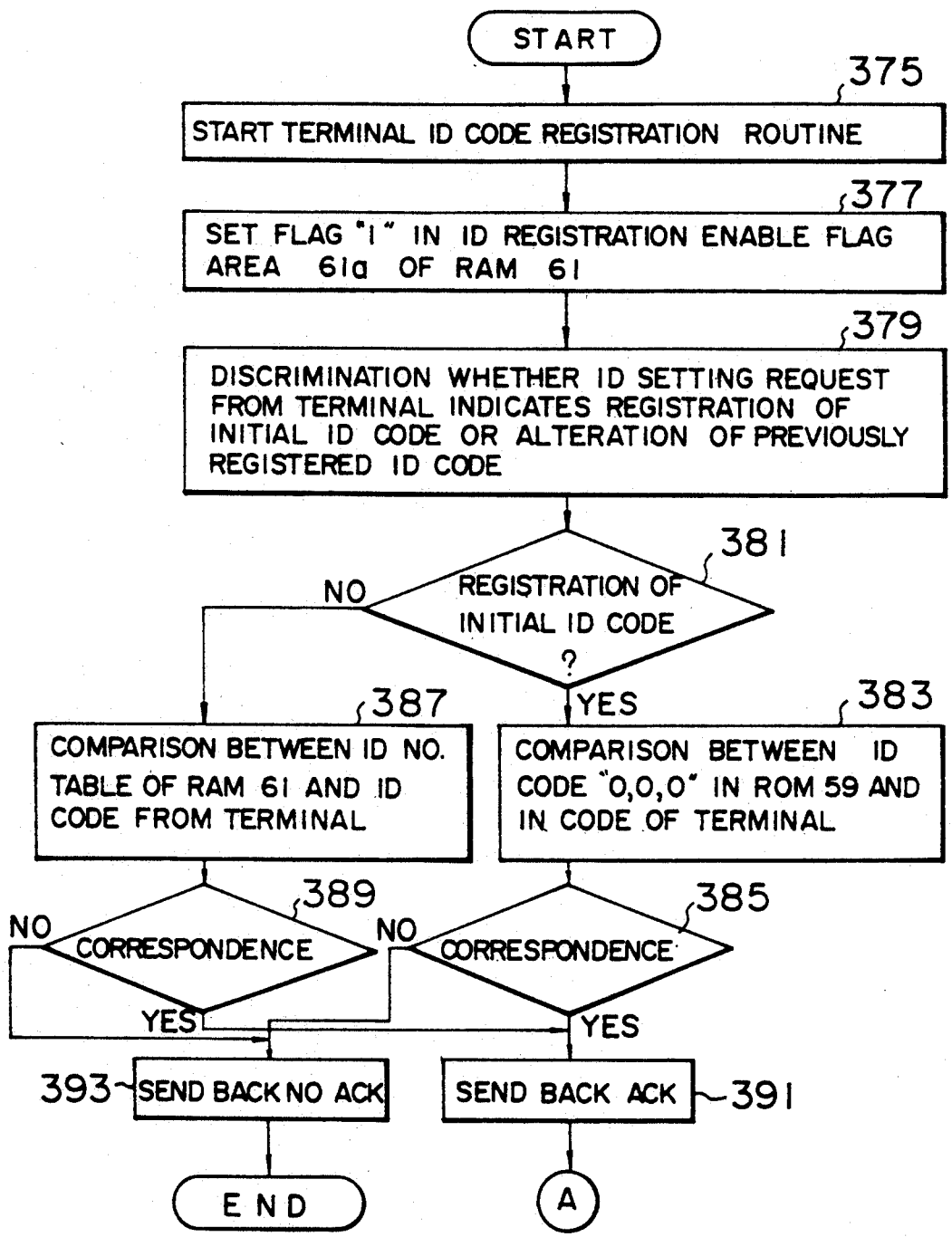
FIGS. 15A and 15B are flowcharts showing the processing by the main unit shown in FIG. 7.
Figure 15B:
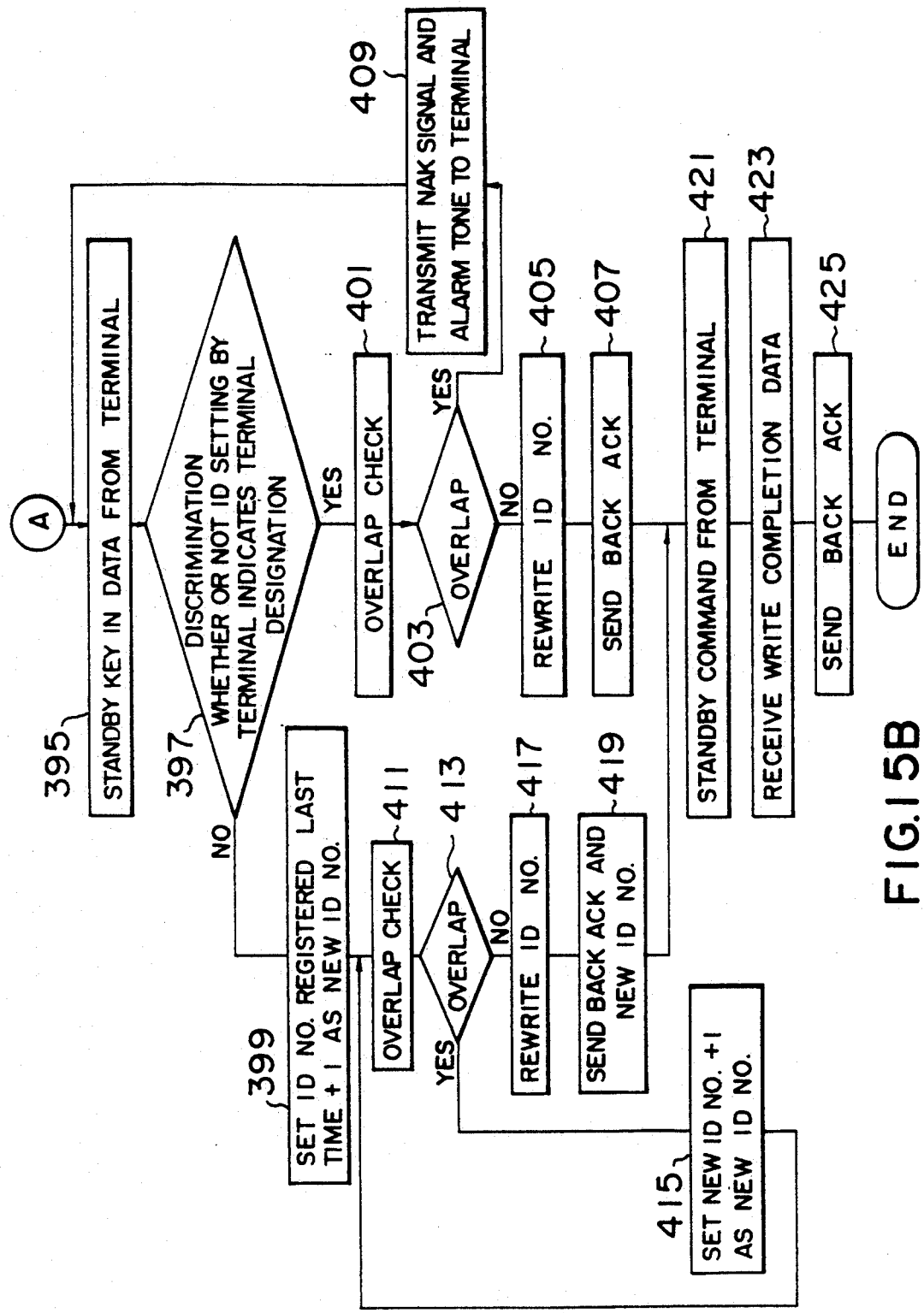

FIG. 12 shows the detail of CPU 13, ROM 17, RAM 19 and I/0 interface 21 of the terminal 50 shown in FIG. 4, and FIG. 13 shows the detail of CPU 55, ROM 59, RAM 61 and I/O interface 63 of the main unit 101 shown in FIG. 7. Further, FIGS. 14A to 14D are flowcharts showing the processing procedure at the terminal 50 in the ID number registration (initial registration) at the time of installation of the system shown in FIG. 8, and FIGS. 15A and 15B are flowcharts showing the processing procedure at the main unit 101 in the above-mentioned registration, respectively.

The detail of the processing in the terminal 50 and the main unit 101 will now be described with reference to these drawings.

Initially, the processing at the terminal 50 will be described with reference to FIG. 12 and FIGS. 14A to 14D.

In the initial registration, a modular plug 200a of signal lines 7, 9 from the main unit 101 is coupled to a modular jack 200b of the terminal 50. Thus, the terminal 50 is initially powered (steps 301, 303 of FIG. 14A). Responding to this, an ID number (initial number) "000" set at the time of forwarding from the factory is read out from the area 51a of the terminal ID number in the EEPROM 51, and is then stored into the register 211 (step 305). Further, a command program for initial routine is read out from the ROM 17, and is then loaded on the CPU 13 (step 307). In this initial routine, the upstream ID number "1000" in accordance with the initial ID number "000" and the ENQ (Enquiry) signal set in advance at a communication controller 221 are constructed as a single packet, and is then stored as transmission data into a code transmit/receive register 223 (step 309). Then, a carrier sensor 225 detects presence and absence of the carrier on the data line 9 to inform a code setting controller 229 of the CPU 13 of a detected result (steps 311, 313). When there is no carrier, the code setting controller 229 instructs the communication controller 221 to transfer transmission data in a code transmit/receive register 223 to a data transmission unit 227. As a result, the transmit data is transmitted to the main unit 101 as the upstream data through the main unit interface circuit 33. Thus, a request for the initial registration to the main unit 101 is made (step 325). Thereafter, the terminal 50 is placed in the state waiting for a command from the main unit 101 (step 317).

When the main unit 101 acknowledges receipt of the registration request, an ACK (Acknowledge) signal is sent back from the main unit 101 to the terminal 50. This ACK signal is received by the downstream data reception unit 217, and is then stored into a register 215 (step 319). The ACK signal and the downstream ID number "0000" attached thereto are stored into the register 215 as the data (step 319). The ID number "000" thereof is transmitted to a comparator 213, at which it is compared with the initial ID number "000" of the terminal 50 which has been read out from the register 211 (step 323). When the both ID numbers are in correspondence with each other, the communication switch 219 is closed. The ACK signal in the register 215 is transmitted to the communication controller 221 through the communication switch 229. When the communication controller 221 receives the ACK signal, it inform the code setting controller 229 of the CPU 13 of the receipt thereof. Thus, the code setting controller 229 recognizes that the initial registration has been authorized by the main unit 101 (step 325 in FIG. 4B). Simultaneously with this, a display (e.g., LED or buzzer) 231 is driven. Thus, user is also informed of the above-mentioned authorization. In addition, the code setting controller 229 controls the main unit interface circuit 33 to close the speaking circuit in the speech interface unit 33a, thus permitting the speaker 37 to output therefrom various tones sent from the main unit 101.

Then, a key operation by the user for designating a new ID number is conducted. In accordance with this key operation, a mode selection to automatically designate a new ID number by the main unit or manually designate it at the terminal is made (step 327). Namely, a mode select unit 234 discriminates whether "*" key is depressed or numerical key is depressed at the key matrix 25 to select an automatic designation by the main unit in the former case, and to select a manual designation at the terminal in the latter case (step 329).

Processing in the case where the manual designation at the terminal is selected will be described. In this case, the mode select unit 234 outputs a logic signal "1". This logic signal "1" is applied to an AND gate 223, thus placing the gate 223 in a through state. In addition, the logic signal "1" is inverted and is then applied to an AND gate 235, thus placing the gate 235 in an open state. A new ID number outputted from the key matrix 25, e.g., data of "001" is written into the RAM 19 through the AND gate in the through state and an OR gate 237, and is also stored into the code transmit/receive register 223 (step 331). Then, carrier sense is conducted. As a result, when there is no carrier on the data line 9, the new ID number "001" is transferred from the code transmit/receive register 223 to the upstream data transmit unit 227, and is then transmitted to the main unit 101 (steps 333 to 337).

In the main unit 101, whether or not the new ID number "001" and the previously registered ID number overlap with each other is checked. As a result, when there is no overlapping, an ACK signal is sent from the main unit 101 back to the terminal 50 (step 339). The code setting controller 229 is informed of the sending back of the ACK signal from the communication controller 221. Thus, the code setting controller 229 recognizes this as the registration command from the main unit. Thus, the new ID number "001" in the RAM 19 is read out and is then transmitted to the EEPROM 51. Under control of the writing/erasing circuit 53, the initial ID number "000" in the terminal ID number area 51a of the EEPROM 51 is rewritten into the new ID number "001" (step 341 in FIG. 14C). When writing of the new ID number "001" into the EEPROM 51 is completed, this new ID number is immediately read out and is then stored into the register 211 (step 343). At times subsequent thereto, the data transmit/receive operation is supervised on the basis of the new ID number "001".

Thereafter, a command program for the processing routine after completion of write operation is read out from the ROM 17 and is then loaded on the CPU 13 (step 349). In this routine, an upstream ID number "1001" in accordance with the new ID number and write completion data determined by the program are constructed as a single packet by the communication controller 221, and are then stored into the code transmit/receive register 223 (step 347). Then, carrier sense is carried out. As a result, when there is no carrier on the data line, data in the register 223 is transmitted to the main unit 101 as upstream data (steps 349 to 353). After this transmission, the terminal 50 is placed in the state writing for a command from the main unit 100 (step 355).

When the main unit 101 receives write completion data, it sends an ACK signal to which a downstream ID number "0001" in accordance with the new ID number is added back to the terminal 50. This sent back data is received by the downstream data receiving unit 217, and is then stored into the register 215 (step 357). The ID number of the data stored in the register 215 is transmitted to the comparator 213, at which it is compared with an ID number which has been read out from the register (step 359). The compared result that both ID numbers are in correspondence with each other means that the new ID number registered at the terminal and the new ID number registered at the main unit are in correspondence with each other. When this correspondence is obtained (step 361), the communication switch 219 is closed. As a result, an ACK signal is transmitted to the communication controller 221. The controller 221 informs the code setting controller 229 of send-back of the ACK signal. Thus, the code setting controller 229 recognizes it as the completion command of the ID number registration process to release the registration mode (step 363).

The processing in the case where the automatic designation mode is selected at the main unit for the new ID number at the step 329 in FIG. 4B will now be described. In this case, the mode select unit 234 outputs a logic signal "0". This logic signal "0" is applied to the AND gate 233, thus placing the gate 233 in an open state. Further, the logic signal is inverted and is then applied to the AND gate 235, thus placing the AND gate 235 in a through state. Thus, the data "*" outputted from the key matrix 25 is transmitted only to the code transmit/receive register 223. Then, carrier sense is carried out (steps 365, 367 in FIG. 14D). As a result, when there is no carrier, the data "*" in the code transmit/receive register 223 is transmitted as the upstream data (step 369).

Upon receiving the data "*", the main unit 101 determines a new ID number which does not overlap with the previously registered ID number. This new ID number is sent back to the terminal 50 along with the ACK signal (step 371) and is then temporarily stored into the code transmit/receive register 223. Thereafter, this new ID number is written into the RAM 19 through the AND gate 235 and the OR gate 237 (step 373). The processing subsequent thereto is the same as the processing (FIG. 14C) in the case of the previously described manual designation mode.

Meanwhile, the processing in the case of altering the ID number during working of the system partially differs from the processing in the case of the above-described initial registration. Namely, in the case of the ID number alteration during working, although not shown in the flowchart, predetermined codes "*#*#*#" and "123456" are inputted from the key matrix in starting the processing, and are temporarily stored into the code transmit/receive register 223. Thereafter, these codes are transmitted to the main unit 101 when there is no carrier. When these codes "*#*#*#" and "123456" are received by the main unit, an ACK signal is sent back from the main unit 101. The processing after sending back of this ACK signal is the same as the processing in the previously described initial registration (the processing at the step 319 and steps thereto in FIG. 14A).

The processing at the main unit 101 will now be described with reference to FIG. 13 and FIGS. 15A and 15B.

In the main unit 101, when the registration authorize unit 248 in the CPU 63 detects that the registration switch 79 has been turned on and an ENQ signal from the terminal 50 has been received, or predetermined codes "*#*#*#" and "123456" have been received from the terminal 50, it recognizes that an ID number registration request from the terminal 50 has been made to initiate the following ID number registration processing routine (step 375 in FIG. 15A).

Thus, the registration authorize unit 248 first sets a permission flag "1" in the ID registration permission flag area 61b in the RAM 61 (step 377). Subsequently, discrimination as to whether the initial ID number is registered or the ID number during working is altered is made (step 379). Namely, where the registration switch 79 is turned on and an ENQ signal is received from the terminal 50, this is discriminated as the initial ID number registration. On the other hand, where predetermined codes "*#*#*#" and "123456" are received, this is discriminated as the ID number alteration during working. It is to be noted that the above-mentioned codes "*#*#*#" and "123456" are registered in advance into the code table 59c in the ROM 59 to collate the text of the received data from the terminal with the code table 59c, thereby making it possible to recognize which code is received.

Meanwhile, the ID number of the terminal 50 attached to the data received from the terminal 50 is transmitted to the ID number identification unit 249. Where the ID number from the terminal 50 is discriminated as the initial ID number registration in the discrimination in the above-mentioned registration authorize unit 248, the ID number identification unit 249 compares the ID number from the terminal 50 with the initial ID number "000" which has been read out from the initial ID number area 59a in the ROM (steps 381, 383). On the other hand, where the ID number from the terminal 50 is discriminated as the ID number alteration during working, the ID number identification unit 249 compares the ID number from the terminal with ID numbers of respective terminals which have been read out from the ID number table 61b in the RAM 61 (steps 381, 387). As a result, when correspondence is obtained, the registration authorize unit 248 responds to this correspondence to control the communication controller 243 to temporarily store the ACK signal and the downstream ID number as a packet into the code transmit/receive register thereafter to transfer them to the downstream data transmitting unit 245. Thus, the ACK signal is transmitted to the terminal 50 (steps 385, 389, 391). In contrast, when correspondence is not obtained as a result of the above comparison, the ACK signal is not sent back. Thus, this routine is completed (step 393).

After sending back of the ACK signal, the main unit 101 is placed in the state waiting for key input data from the terminal (step 395 in FIG. 15B). When the key input data is sent from the terminal 50, discrimination of the ID number designation mode is made at the mode select unit 250 on the basis of the data thus sent (step 397). Namely, when the numerical data is received, the operational mode is discriminated as the manual designation mode, while when the data "*" is received, the operational mode is discriminated as the automatic designation mode by the main unit.

Where the operational mode is discriminated as the manual designation mode, the new ID number received from the terminal 50, e.g., "001" is inputted to the ID number overlapping unit 251 of the CPU 55, at which it is collated with the ID number table 61a of the RAM 61. Thus, whether or not the new ID number overlaps with the previously registered ID number (step 401). As a result, if there is any overlapping, the communication controller 243 is controlled so that a NCK (Negative Acknowledge) signal is transmitted to the terminal 50, and the sound source circuit 69 is driven so that an alarm tone is transmitted to the terminal 50 (step 409). Thereafter, the main unit 101 is placed in the state waiting for key input data from the terminal 50. On the other hand, where there is no overlapping, the ID number of the terminal concerned in the ID number table 61a is rewritten to provide the new ID number "001" by the ID number rewrite unit 252, and the communication controller 243 is controlled to send the ACK signal back to the terminal 50 (steps 403, 405, 407).

On the other hand, where the automatic designation mode is selected by the mode select unit 250, the new ID number designation unit 253 reads out the ID number rewritten last time from the ID number table 61a to designate the number obtained by adding "1" to that number as the new ID number (step 399). Then, the new ID number is delivered to the ID number overlapping discrimination unit 251, at which whether or not the ID number overlaps with the ID number table 61a is checked (step 411). If there is no overlapping, the value obtained by "1" to the new ID number is redesignated as the new ID number at the new ID number designation unit 253 (step 415). Thus, overlapping check is carried out for a second time. This processing is repeated until a new ID number which does not overlap with other ID numbers is provided. When no overlapping new ID number is obtained, the ID number of the terminal concerned in the ID number table 61a is rewritten so that the above-mentioned new ID number result, and the communication controller 243 is controlled, so the ACK signal and the new ID number are sent back to the terminal 50 (steps 413, 417, 419).

Thereafter, the main unit 101 is placed in the state waiting for a command from the terminal 50 (step 421). When the command from the terminal 50 is received and is in correspondence with the write completion data registered in advance in the code table 59c of the ROM 59, the ACK signal is sent back to the terminal 50. Thereafter, this routine is completed (steps 423, 425).

Meanwhile, the processing at the main unit 100 having no registration switch 79 shown in FIG. 5 partially differs, in the portion of FIG. 15A, from the processing at the main unit 101 having the above-mentioned registration switch 79. Namely, in the main unit 100, on the condition that a predetermined registration request data is received from the terminal 50, the registration processing routine is initiated. As the registration request data, a code in the case of the initial ID number registration and that in the case of the ID number alteration during working may be determined in a manner that they are different from each other or equal to each other. In the case of the same code, discrimination between the initial ID number registration and the ID number alteration during working is carried out by the ID number included in the heading of the received data from the terminal. Namely, when the ID number included in the heading is the initial ID number "000", the operational mode is judged as the initial ID number registration mode, so an ACK signal is sent back to the terminal. On the other hand, when the ID number in the heading is not in correspondence with the initial ID number "000", the operational mode is juded as the mode of the ID number alteration during working. In this case, that ID number is collated with the ID number table 61a. As a result, when no correspondence is obtained, the ACK signal is not sent back. In contrast, when correspondence is obtained, the ACK signal is sent back to the corresponding terminal. The processing subsequent thereto is the same as the previously described processing of FIG. 15B.

When judgement as to whether or not the ID number registration is allowed is made on the basis of not only the terminal ID number but also the system ID number peculiar to the main unit, it is prevented to arbitrarily connected and use a terminal brought from a different system, resulting higher security. In the system in which the above concept is realized, an area 59b in which system ID numbers are registered in advance is provided in the ROM 59 of the main unit 59, and a memory area 51b for system ID numbers is provided also in the EEPROM 51 of the terminal. Further, as shown in FIG. 11, system ID numbers and terminal ID numbers are included in the heading of a data packet communicating between the terminals and the main unit. When a terminal is connected to the main unit, a system ID number attached to upstream data initially transmitted from the terminal to the main unit is inputted to the system ID number test unit 255 in the CPU 55 of the main unit. If that system ID number is not in correspondence with the system ID number set in advance in the ROM 59 of the main unit, authorization is inhibited with respect to the registration authorize unit 148. Alternatively, the following modification may be made. Namely, only terminal ID numbers are ordinarily included in the data communicating between the terminals and the main unit. However, in the case of only above-mentioned initial upstream data, the system ID number is attached to this upstream data and is then transmitted to the main unit. In the main unit, the system ID number attached to the initial upstream data is checked. As a result, when this system ID number is not in correspondence with the system ID number in the ROM 59, authorization of registration is inhibited.

While various preferred embodiments of this invention have been described, it is needless to say that this invention is not limited to these embodiments. It is believed that various modifications made by a person skilled in the art without departing from the gist of the invention may be included within the scope of this invention.

I claim:

1. A communication system, including a center and a plurality of terminals communicable with the center, identification numbers of the respective terminals being registered in advance in the center, data being communicated between the center and the respective terminals;

each of the terminals comprising:

(a) terminal side memory means for storing a determined identification number of the terminal registered therefor;

(b) terminal side communication means for effecting data communication with the center, the terminal side communication means transmitting to the center an initial identification number initially stored in the terminal side memory means, when the terminal operates initially, each proper initial identification number including a predetermined common code;

(c) input means for inputting an arbitrary number as a proposed identification number of the terminal, the proposed identification number being transmitted to the center through the terminal side communication means; and (d) terminal side registration means for registering the proposed identification number as the determined identification number in the terminal side memory means only when a registration instruction data is received from the center by the terminal side communication means;

the center comprising:

(e) center side memory means for storing determined identification numbers of all the terminals registered therein;

(f) center side communication means for effecting data communication with the terminals;

(g) authorizing means for authorizing the registration of the proposed identification number on the condition that the initial identification number received from the terminal is in correspondence with a predetermined initial identification number which is commonly applied to all the terminals;

(h) overlap check means for checking whether or not the proposed identification number received from the terminal and the determined identification numbers of the other terminals previously registered in the center side memory means overlap with each other;

(i) center side registration means for registering the proposed identification number as the determined identification number of the terminal in the center side memory means only when the registration of the proposed identification number is authorized by the authorizing means and a check result indicative of no overlapping is obtained from the overlap check means; and (j) center side control means for transmitting the registration instruction data to the terminal through the center side communication means only when the registration of the proposed identification number is authorized by the authorizing means and the check result indicative of no overlapping is obtained from the overlap check means, thereby permitting the terminal to register the proposed identification number in the terminal side memory means.

2. A communication system as set forth in claim 1, wherein the terminal side memory means and the center side memory means are comprised of electrically rewritable non-volatile semiconductor memories, respectively.

3. A communication system as set forth in claim 1, wherein the authorizing means includes a switch means, which is capable of authorizing only when the switch means is in the ON state.

4. A communication system as set forth in claim 1, wherein a system identification number is further stored in the terminal side memory means;

wherein the terminal side communication means transmits the system identification number to the center in addition to the initial identification number, when the terminal operates initially; and wherein the authorizing means is capable of authorizing only when the system identification number received from the terminal is in correspondence with a predetermined system identification number.

5. In a communication system in which terminal identification numbers registered in a center and terminals are attached to data communicated therebetween, a method for the management of registration of each terminal identification number comprising:

transmitting an initial identification number initially registered in one of the terminals, when the terminal operates initially;

inputting an arbitrary number into said one of the terminals as a proposed identification number of the terminal;

transmitting the inputted proposed identification number from the terminal to the center;

authorizing registration of the proposed identification number at the center only when the initial identification number received from the terminal is in correspondence with a predetermined number code commonly applied to all the terminals;

checking at the center to determine whether the proposed identification number transmitted from the terminal and identification numbers of the other terminals previously registered in the center overlap with each other; and rewriting the identification number of the terminal previously registered in the center and in the terminal into the proposed identification number on the condition that the registration is authorized by the step of authorizing and that a checked result of no overlap is obtained by the step of checking.

* * * * *